United States Patent
Song et al.

(10) Patent No.: US 7,373,423 B2
(45) Date of Patent: May 13, 2008

(54) NETWORK INFRASTRUCTURE MANAGEMENT AND DATA ROUTING FRAMEWORK AND METHOD THEREOF

(75) Inventors: Feng-Shiuh Song, Banchiau (TW); Chung-Ling Lo, Taipei (TW); Chih-Yu Chen, Taipei (TW); Chi-Bin Li, Hsin-Tien (TW); Jiann-Cherng Luo, Banchiau (TW)

(73) Assignee: Trend Micro Incorporated, Tokyo (JP)

( * ) Notice: Subject to any disclaimer, the term of this patent is extended or adjusted under 35 U.S.C. 154(b) by 716 days.

(21) Appl. No.: 10/243,490

(22) Filed: Sep. 11, 2002

(65) Prior Publication Data

US 2004/0049594 A1    Mar. 11, 2004

(51) Int. Cl.
*G06F 15/173* (2006.01)
(52) U.S. Cl. ............. 709/238; 709/220; 709/227; 709/249; 370/389; 370/392; 370/401
(58) Field of Classification Search ............ 709/220, 709/227, 238, 248–249; 370/389, 392, 400–401
See application file for complete search history.

(56) References Cited

U.S. PATENT DOCUMENTS

| | | | |
|---|---|---|---|
| 5,740,375 A | * | 4/1998 | Dunne et al. ............ 709/238 |
| 5,768,552 A | * | 6/1998 | Jacoby ..................... 345/441 |
| 6,496,477 B1 | * | 12/2002 | Perkins et al. ........... 370/228 |
| 6,603,769 B1 | * | 8/2003 | Thubert et al. .......... 370/401 |
| 6,856,991 B1 | * | 2/2005 | Srivastava ................ 707/10 |

* cited by examiner

*Primary Examiner*—LaShonda T Jacobs
(74) *Attorney, Agent, or Firm*—Beyer Law Group LLP

(57) ABSTRACT

The invention generally provides a method for routing data into and out of a network having a plurality of host computers corresponding to a plurality of network topologies. The method of the invention primarily comprises the steps of electing a destination host from the plurality of host computers in the network, determining an addressing methodology for the destination host in accordance with a destination topology out of the plurality of network topologies corresponding to the destination host, addressing the destination host according to the determined addressing methodology, determining a routing path corresponding to the determined addressing methodology, and routing the data to the destination host through the determined routing path. The routing path can be an inbound or an outbound routing path with respect to the network. The method according to the invention further comprises the step of defining the routing path with a host ID comprising a sequence of at least one host address corresponding to at least one of the plurality of host computers.

87 Claims, 19 Drawing Sheets

- Directly accessible
  - Inbound path of H = *host address of H*

- HostID (Inbound path) of H = 210.192.100.1:10319 or test.trendmicro.com:10319

210.192.100.1:10319
(test.trendmicro.com:10319)

- HostID (Inbound path) of H =
  210.192.100.1:10319|210.192.100.2:10319 or
  test.trendmicro.com:10319

210.192.100.1:10319
210.192.100.2:10319
(test.trendmicro.com:10319)

H

- HostID (Inbound path) of H = 210.192.100.1:10319 or test.trendmicro.com:10319

210.192.100.1:10319
10.1.100.1:10319
(test.trendmicro.com:10319)

H

- HostID (Inbound path) of H = 210.192.100.1:10319 or test.trendmicro.com:10319

- HostID (Inbound path) of H = 210.192.100.1:12345

- HostID (Inbound path) of H =
  210.192.100.1:12345~10.1.100.1:10319 or
  210.192.100.1:12345~test.trendmicro.com:10319

- HostID (inbound path) of H1 = 210.192.100.1:12345~10.1.100.1:10319 or 210.192.100.1:12345~host1.com:10319
- HostID (inbound path) of H = 210.192.100.1:12345~10.1.100.1:10319 > proxy1110.com:1111~host.com:2222

Fig. 17 Outbound Path

- Reach Internet directly
  — Outbound path of H = empty

- Outbound path of H = 210.192.100.1:12345~...

NETWORK INFRASTRUCTURE MANAGEMENT AND DATA ROUTING FRAMEWORK AND METHOD THEREOF

BACKGROUND OF THE INVENTION

1. Field of the Invention

The invention claimed in the present patent application generally relates to computer network infrastructure management and, more particularly, to a data routing framework over various network topologies.

2. Description of the Related Art

A primary network management objective for a computer network in the art is to manage the infrastructure and data routing within and without the network. A network generally comprises a plurality of computers connected to each other. Data can travel into and out of the network, with the data being routed to a particular computer therein or out therefrom to the Internet or another network. For data inbound into the network, proxy servers are typically used in the art for routing the inbound data and preventing the entry of computer viruses into the network. For outbound data, proxy servers are typically used in the art for properly routing the outbound data from within the network and out to the Internet or another network. A proxy server is generally disposed between the Internet and a computer in the network. A proxy is a program that receives Internet service requests by a computer in the network and makes those requests to the Internet through a single Internet protocol (IP) address.

Data routing is generally direct when accessing the computers in the network. However, routing data through proxy servers for accessing computers in the network or computers protected by firewalls becomes circuitous in navigating through the proxy addressing. These shortcomings in the art become exacerbated as the topologies of the network become more complex.

There is thus a general need in the art for an optimal network architecture that overcomes at least the aforementioned shortcomings in the art. In particular, a need exists in the art for a data routing framework and method thereof for efficient access to computers in the network having firewalls and proxy servers or other complex network topologies.

SUMMARY OF THE INVENTION

The invention accordingly provides an optimal network architecture that overcomes at least the aforementioned shortcomings in the art. In particular, a preferred embodiment according to the invention advantageously provides a data routing framework and method thereof for efficient access to computers in the network having firewalls and proxy servers or other complex network topologies.

The invention generally provides a method for routing data into and out of a network having a plurality of host computers corresponding to a plurality of network topologies. A preferred embodiment of the method of the invention comprises the steps of electing a destination host from the plurality of host computers in the network, determining an addressing methodology for the destination host in accordance with a destination topology out of the plurality of network topologies corresponding to the destination host, addressing the destination host according to the determined addressing methodology, determining a routing path corresponding to the determined addressing methodology, and routing the data to the destination host through the determined routing path. The routing path can be an inbound or an outbound routing path with respect to the network. The method according to this further embodiment of the invention further comprises the step of defining the routing path with a host ID comprising a sequence of at least one host address corresponding to at least one of the plurality of host computers.

Another preferred embodiment of the data routing method according to the invention comprises the steps of determining if the data are routed inbound with respect to the network, electing a destination computer from the computers if it is determined that the data are routed inbound, determining if the data are routed outbound with respect to the network, determining an inbound routing path to the destination computer having an inbound host ID in accordance with an inbound topology out of the plurality of network topologies if it is determined that the data are routed inbound, determining an outbound routing path to the Internet having an outbound host ID in accordance with an outbound topology with respect to the Internet out of the plurality of network topologies if it is determined that the data are routed outbound, routing the data to the destination computer according to the inbound routing path if it is determined that the data are routed inbound, and routing the data to the Internet according to the outbound routing path if it is determined that the data are routed outbound.

The network topologies according to the invention further comprise a packet filtering firewall topology, a port forwarding firewall topology, a proxy topology, a private Internet protocol (IP) topology, multiple Internet protocol (IP) topology, and a dynamic host configuration protocol (DHCP) assigned Internet protocol (IP) topology. The inbound host ID can include an address separator. In particular, the inbound host ID can further comprise an Internet protocol (IP) address, a domain name, a network port number, a hypertext transfer protocol (HTTP) proxy separator, a SOCKS proxy separator, and a concatenator. The outbound host ID can include an address separator. In particular, the outbound host ID can further comprise an Internet protocol (IP) address, a domain name, a network port number, a hypertext transfer protocol (HTTP) proxy separator, a SOCKS proxy separator, and a concatenator. The inbound host ID can further comprise a sequence of at least one host address corresponding to at least one of the computers.

An additional preferred embodiment of a network routing data thereto and therefrom according to the invention comprises a plurality of computers corresponding to a plurality of network topologies, means for determining if the data are routed inbound with respect to the network, an elector electing a destination computer from the computers if it is determined that the data are routed inbound, means for determining if the data are routed outbound with respect to the network, means for determining an inbound routing path to the destination computer having an inbound host ID based on the inbound topology if it is determined that the data are routed inbound, means for determining an outbound routing path to the Internet having an outbound host ID based on the outbound topology if it is determined that the data are routed outbound, an inbound router routing the data to the destination computer according to the inbound routing path if it is determined that the data are routed inbound, and an outbound router routing the data to the Internet according to the outbound routing path if it is determined that the data are routed outbound.

BRIEF DESCRIPTION OF THE DRAWINGS

The foregoing features and advantages of the invention will become more apparent in the following Detailed Description when read in conjunction with the accompanying drawings (not necessarily drawn to scale), in which.

DETAILED DESCRIPTION OF PREFERRED EMBODIMENTS

Figure 1:
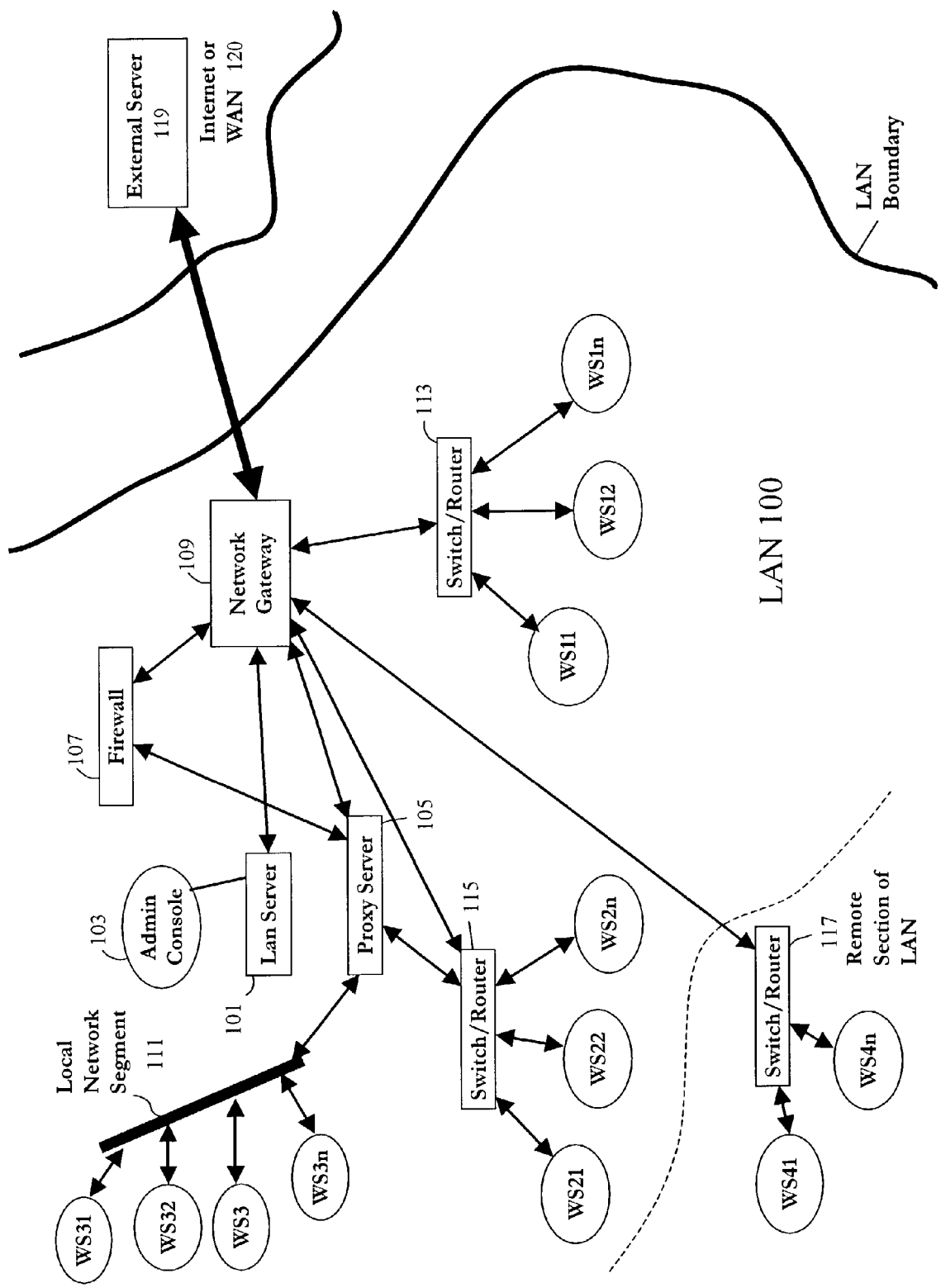
FIG. 1 is a block diagram generally illustrating a network architecture having various network topologies utilizing the invention.

FIG. 1 is a block diagram that generally illustrates a network architecture having various network topologies utilizing the invention. Referring to FIG. 1, a local area network (LAN) 100 comprises a plurality of network topologies, including firewalls (e.g., firewall 107), proxies (e.g., proxy server 105). A firewall examines traffic coming from and going to the Internet, and dynamically filters out undesired content, including messages from certain Internet protocol (IP) addresses. Further network topologies can include a packet filtering firewall topology, port forwarding firewall topology, a proxy topology, a private Internet protocol (IP) topology, multiple IP topology, and dynamic host configuration protocol (DHCP) assigned IP topology. DHCP is a technique used in Windows™ for dynamically assigning IP addresses. The IP address assignment in DHCP is transparent to the computers and workstations within the network. That is, the computers and workstations within the network do not require knowledge of the IP of the DHCP server for data access. With DHCP, IP addresses need not be individually assigned to and configured for every computer and workstation in the network, which automatically find themselves a free IP when they are turned on with the help of the DHCP server.

Referring to FIG. 1, LAN 100 is connected to the Internet or WAN 120 through the Internet where it can access an external server 119, which can be, e.g., an application service provider, commercial service provider, network service provider, or antivirus service provider. LAN 100 comprises a network gateway 109 receiving and forwarding data respectively in and out of LAN 100, a firewall 107 for antivirus protection, a LAN server 101 connected to a network administration console 103, a proxy server 105 for proxy addressing, a local network segment 111 further comprising a plurality of host computers or workstations WS31, WS32, . . . , and WS3n, a switch/router 115 connected to another plurality of host computers or workstations WS21, WS22, . . . , and WS2n, another switch/router 113 connected to yet another plurality of host computers or workstations WS11, WS12, . . . , and WS1n, and yet another switch/router 117 at a remote section of the LAN 100 connected to another plurality of host computers or workstations WS41, . . . , and WS4n. The network gateway 109 is connected to the routers 113, 115 and 117, the LAN server 101, and the firewall 107.

Figure 2:
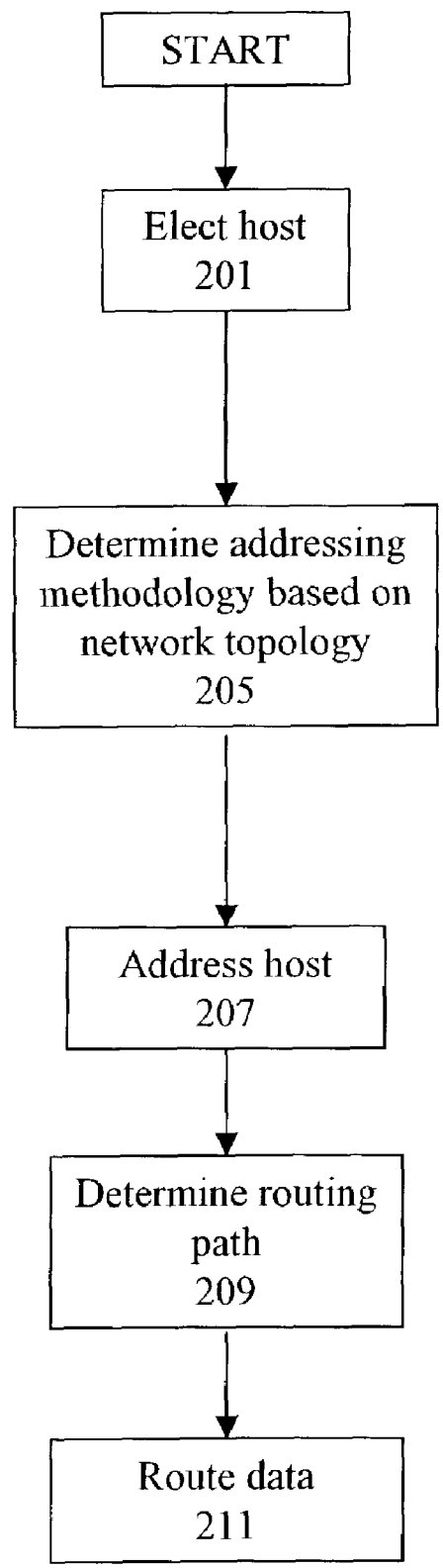
FIG. 2 is a flow diagram generally illustrating the data routing method for a computer network according to the invention.

FIG. 2 is a flow diagram that generally illustrates the data routing method for a computer network according to a general embodiment of the invention. Viewing FIG. 2 in conjunction with the LAN 100 of FIG. 1, the data routing method according to this embodiment of the invention comprises the steps of electing a destination host from the plurality of host computers in the network (step 201), determining an addressing methodology for the destination host in accordance with a destination topology out of the plurality of network topologies corresponding to the destination host (step 205), addressing the destination host according to the determined addressing methodology, determining a routing path corresponding to the determined addressing methodology (step 207), and routing the data to the destination host through the determined routing path (step 211). The routing path can be an inbound or an outbound routing path with respect to LAN 100.

The method according to a further embodiment of the invention further comprises the step of defining the routing path with a host ID comprising a sequence of at least one host address corresponding to at least one of the plurality of host computers. The host ID can include an address separator. In particular, the host ID can further comprise an Internet protocol (IP) address, a domain name, a network port number, a secure sockets layer (SSL) separator, a hypertext transfer protocol (HTTP) proxy separator, a SOCKS proxy separator, or a concatenator. SSL is a protocol for data communications over an encrypted connection, and for data access authentication within and without the network. HTTP is a protocol used on the Internet by web browsers to transport text and graphics by retrieving one web page at a time. SOCKS is a proxy server protocol that allows data access authentication for tunneling through proxy servers by hiding the IP addresses of the computers within the network from outside the network.

Figure 3:
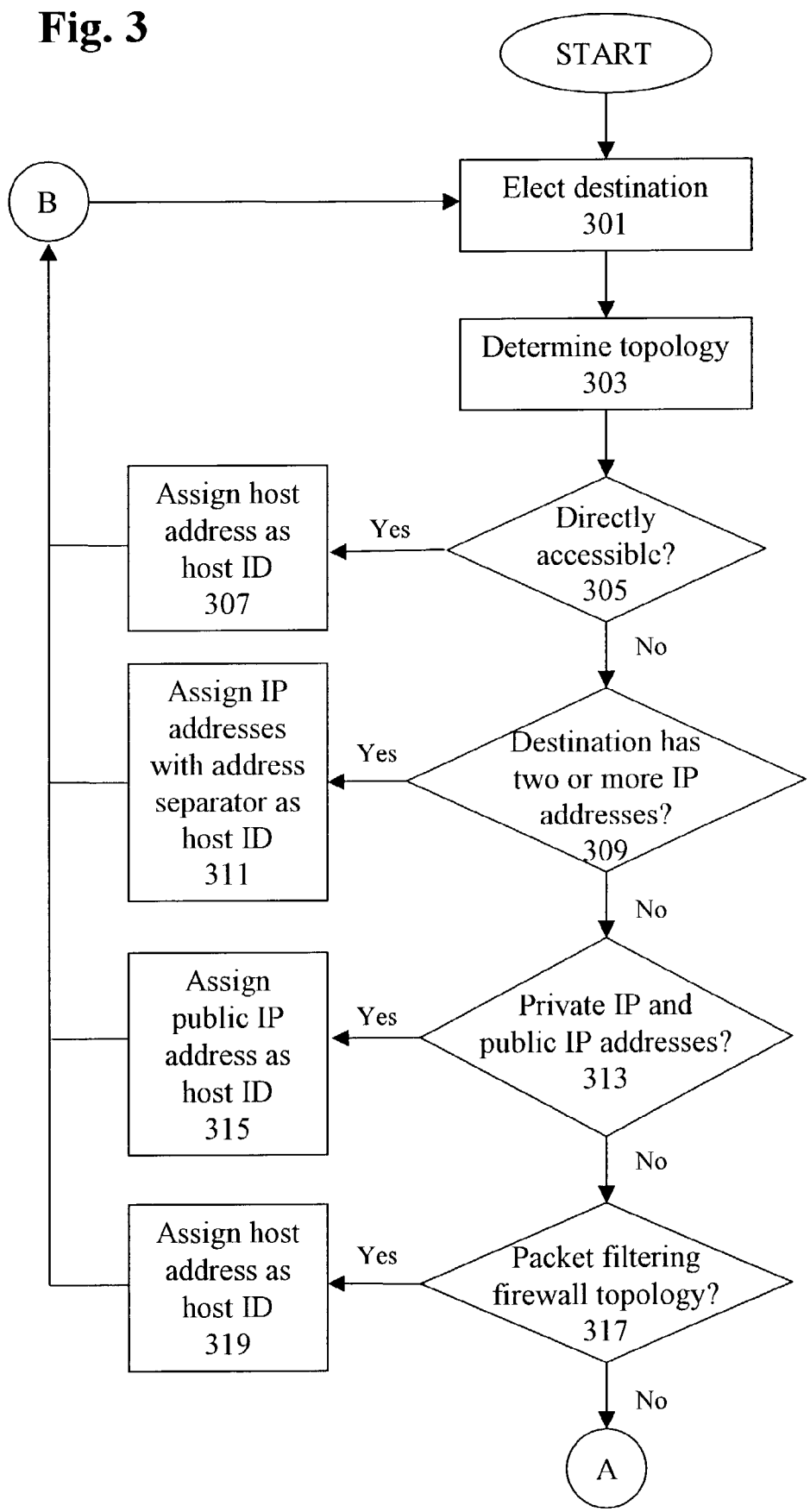
FIGS. 3 and 4 are flow diagrams illustrating the data routing method for a computer network according to further embodiments of the invention.
Figure 4:
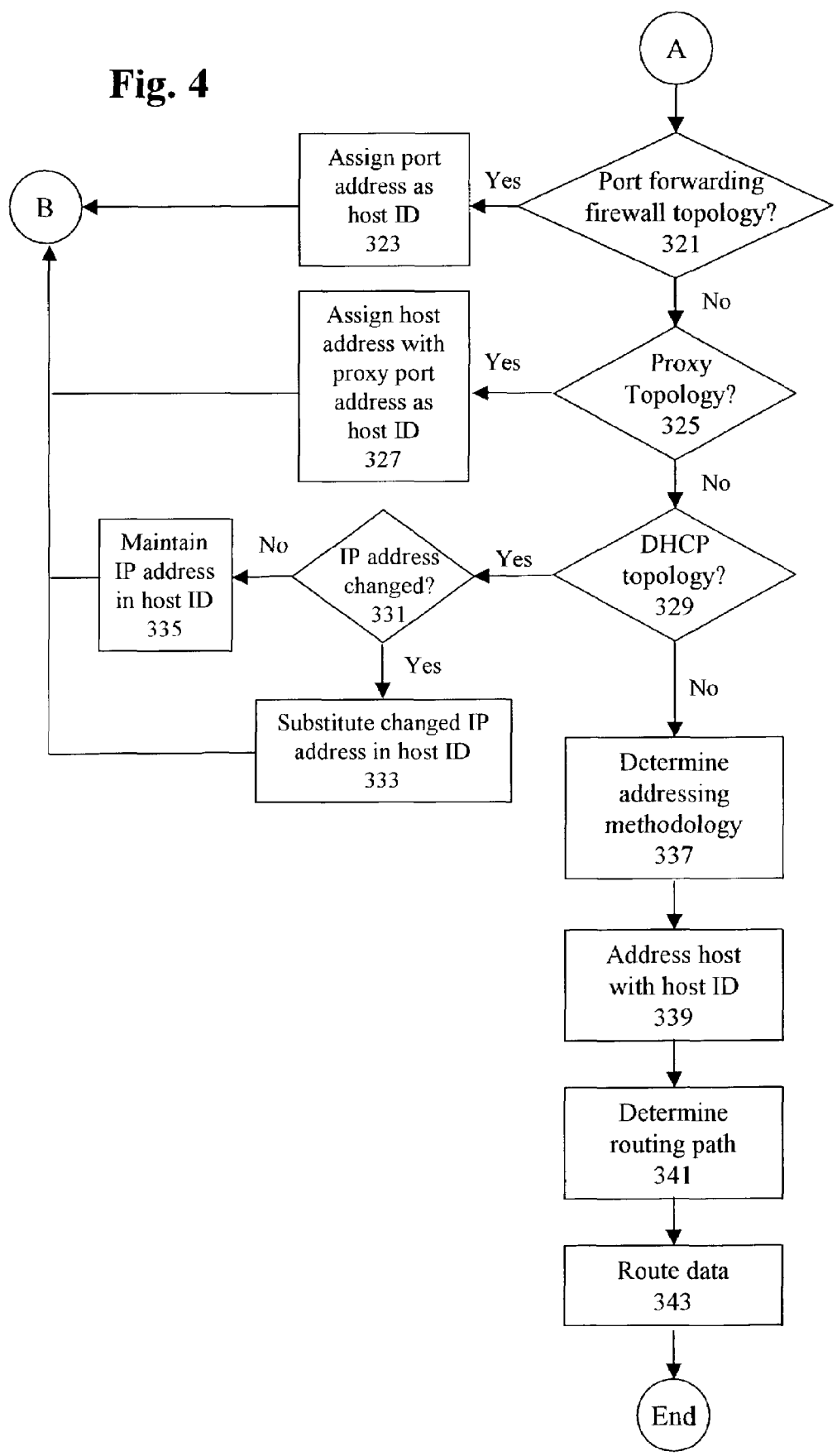

FIGS. 3 and 4 are flow diagrams that illustrate the data routing method for a computer network according to further embodiments of the invention. Referring to FIG. 3, a destination host is elected for access thereto from a plurality of host computers or workstations in the network (step 301). In step 303, a network topology is determined among a plurality of network topologies for the elected destination host or workstation. The plurality of network topologies can include a packet filtering firewall topology, port forwarding firewall topology, a proxy topology, a private Internet protocol (IP) topology, multiple IP topology, and dynamic host configuration protocol (DHCP) assigned IP topology.

In step 305, it is determined whether the elected destination host or workstation is directly accessible. If it is determined in step 305 that the elected destination host or workstation is directly accessible, the control flow of the process according to the invention is directed to step 307. In step 307, a host address of the elected destination host or workstation is assigned as the host ID for defining the routing path for data access thereto. The host address can comprise an IP address with a network port number, or a domain name plus a network port number. The control flow of the process according to the invention is then reverted to step 301 through step B. If it is otherwise determined in step 305 that the elected destination host or workstation is not directly accessible, the control flow of the process according to the invention is directed to step 309.

In step 309, it is determined whether the destination host or workstation comprises two or more Internet protocol (IP) addresses. If it is determined in step 309 that the destination host or workstation comprises two or more Internet protocol (IP) addresses, the control flow of the process according to the invention is directed to step 311. In step 311, the IP addresses separated by an address separator are assigned as the host ID for defining the routing path for data access to the elected destination host or workstation. The host address can comprise, in sequential order, an IP address with a network port number, an address separator (i.e. "|"), and a further IP address with a further network port number. The host address can also comprise a domain name plus a network port number. The control flow of the process according to the invention is then reverted to step 301 through step B. If it is otherwise determined in step 309 that the destination host or workstation does not include two or more Internet protocol (IP) addresses, the control flow of the process according to the invention is directed to step 313.

In step 313, it is determined whether the destination host or workstation comprises a private Internet protocol (IP) address and a public IP address. If it is determined in step 313 that the destination host or workstation comprises a private IP address and a public IP address, the control flow of the process according to the invention is directed to step 315. In step 315, the public IP address is assigned as the host ID for defining the routing path for data access to the elected destination host or workstation. The control flow of the process according to the invention is then reverted to step 301 through step B. An exception exists in a situation in which the destination host and the start position for sending the data are located within the same private network, where the private IP address is assigned as the host ID. If it is otherwise determined in step 313 that the destination host or workstation does not include a private IP address and a public IP address, the control flow of the process according to the invention is directed to step 317.

In step 317, it is determined whether a packet filtering firewall topology is involved in accessing the destination host or workstation. If it is determined in step 317 that a packet filtering firewall topology is involved in accessing the destination host or workstation, the control flow of the process according to the invention is directed to step 319. In step 319, a host address of the destination host or workstation is assigned as the host ID for defining the routing path for data access thereto. The host address can comprise an IP address with a network port number, or a domain name plus a network port number. The control flow of the process according to the invention is then reverted to step 301 through step B. If it is otherwise determined in step 317 that a packet filtering firewall topology is not involved in accessing the destination host or workstation, the control flow of the process according to the invention is directed to step A, which continues onto step 321.

Referring to FIG. 4 in particular, it is determined whether a port forwarding firewall topology is involved in accessing the destination host or workstation (step 321). If it is determined in step 317 that a port forwarding firewall topology is involved in accessing the destination host or workstation, the control flow of the process according to the invention is directed to step 323. In step 323, a port address of a firewall port connected to the destination host or workstation is assigned as the host ID for defining the routing path for data access thereto. The port address can comprise an IP address with a network port number, or a domain name plus a network port number. The control flow of the process according to the invention is then reverted to step 301 through step B. If it is otherwise determined in step 321 that a port forwarding firewall topology is not involved in accessing the destination host or workstation, the control flow of the process according to the invention is directed to step 325.

In step 325, it is determined whether a proxy topology is involved in accessing the destination host or workstation. If it is determined in step 325 that a proxy topology is involved, the control flow of the process according to the invention is directed to step 327. In step 327, a host address of the destination host or workstation with a port address of a proxy port connecting to the Internet are assigned as the host ID for defining the routing path for data access thereto. The host address and the port address for the proxy port are separated by an address separator. The host address comprises, in sequential order, an IP address with a network port number, an address separator, a further IP address with a further network port number. The address separator can further comprise a secure sockets layer (SSL) separator, i.e. a hypertext transfer protocol (HTTP) proxy separator, i.e. "*" or a SOCKS proxy separator, i.e. "&". The control flow of the process according to the invention is then reverted to step 301 through step B. If it is otherwise determined in step 321 that a proxy topology is not involved, the control flow of the process according to the invention is directed to step 329.

In step 329, it is determined whether a dynamic host configuration protocol (DHCP) assigned IP topology is involved in accessing the destination host or workstation. If it is determined in step 329 that a DHCP assigned IP topology is not involved, the control flow of the process according to the invention is directed to step 337. If it is determined in step 329 that a DHCP assigned IP topology is involved, the control flow of the process according to the invention is directed to step 331. In step 331, it is determined whether an IP address in the host ID has dynamically changed in accordance with DHCP. If it is determined in step 331 that the IP address has dynamically changed in accordance with DHCP, the control flow of the process according to the invention is directed to step 333. In step 333, the changed IP address is substituted for the IP address in the host ID for defining the data access routing path. Moreover, the data routing method according to a further embodiment of the invention can further comprise the step of notifying all of the host computers or workstations of the changed IP address in the host ID. The control flow of the process according to the invention is then reverted to step 301 through step B. If it is determined in step 331 that the IP address has not changed in accordance with DHCP, the control flow of the process according to the invention is directed to step 335. In step 335, the IP address in the host ID is maintained without change in defining the data access routing path. The control flow of the process according to the invention is similarly reverted to step 301 through step B.

In step 337, the addressing methodology for the destination host or workstation is determined. In step 339, the destination host or workstation is accordingly addressed with the host ID therefor. The routing path for accessing the destination host or workstation is accordingly determined with the host ID (step 341). In step 343, the data routing is implemented according to the determined routing path.

In further embodiments of the invention, the data routing method can further include data access authentication comprising the steps of embedding authentication data in the host ID itself, or deploying the authentication data on all of the host computers or workstations in the network.

Another preferred embodiment of the data routing method according to the invention comprises the steps of determining if the data are routed inbound with respect to the network, electing a destination computer from the computers if it is determined that the data are routed inbound, determining if the data are routed outbound with respect to the network, determining an inbound routing path to the destination computer having an inbound host ID in accordance with an inbound topology out of the plurality of network topologies if it is determined that the data are routed inbound, determining an outbound routing path to the Internet having an outbound host ID in accordance with an outbound topology with respect to the Internet out of the plurality of network topologies if it is determined that the data are routed outbound, routing the data to the destination computer according to the inbound routing path if it is determined that the data are routed inbound, and routing the data to the Internet according to the outbound routing path if it is determined that the data are routed outbound.

The network topologies according to the invention further comprise a packet filtering firewall topology, a port forwarding firewall topology, a proxy topology, a private Internet protocol (IP) topology, multiple Internet protocol (IP) topology, and a dynamic host configuration protocol (DHCP) assigned Internet protocol (IP) topology. The inbound host ID can include an address separator. In particular, the e inbound host ID can further comprise an Internet protocol (IP) address, a domain name, a network port number, a secure sockets layer (SSL) separator, a hypertext transfer protocol (HTTP) proxy separator, a SOCKS proxy separator, and a concatenator. The outbound host ID can include an address separator. In particular, the outbound host ID can further comprise an Internet protocol (IP) address, a domain name, a network port number, a secure sockets layer (SSL) separator, a hypertext transfer protocol (HTTP) proxy separator, a SOCKS proxy separator, and a concatenator. The inbound host ID can further comprise a sequence of at least one host address corresponding to at least one of the computers.

Another embodiment of the data routing method according to the invention further comprises the steps of determining if the destination computer is directly accessible, and assigning a host address of the destination computer as the inbound host ID if it is determined that the destination computer is directly accessible. The host address comprises an Internet protocol (IP) address with a network port number. The host address can otherwise comprise a domain name plus a network port number.

Yet another embodiment of the data routing method according to the invention further comprises the step of determining if the destination computer comprises two or more Internet protocol (IP) addresses, wherein the host address comprises the IP addresses separated by an address separator if it is determined that the destination computer is directly accessible and the destination computer comprises two or more IP addresses. The host address comprises, in sequential order, an Internet protocol (IP) address with a corresponding network port number, an address separator, and another IP address with an associated network port number. The host address can also comprise a domain name plus a network port number.

An additional embodiment of the data routing method according to the invention further comprises the steps of determining if the destination computer comprises a private Internet protocol (IP) address and a public IP address, and assigning the public IP address as the host address if it is determined that the destination computer is directly accessible.

Yet an additional embodiment of the data routing method according to the invention further comprises the steps of determining if the inbound topology is a packet filtering firewall topology, and assigning a host address of the destination computer as the inbound host ID if it is determined that the inbound topology is a packet filtering firewall topology. The host address can comprise an Internet protocol (IP) address with a network port number. The host address can otherwise comprise a domain name plus a network port number.

Another embodiment of the data routing method according to the invention further comprises the steps of determining if the inbound topology is a port forwarding firewall topology, and assigning a port address of a firewall port connected to the destination computer as the inbound host ID if it is determined that the destination topology is a port forwarding firewall topology. The port address can comprise an Internet protocol (IP) address with a network port number. The port address can otherwise comprise a domain name plus a network port number.

Yet another embodiment of the data routing method according to the invention further comprises the steps of determining if the inbound topology is a proxy topology, and assigning a host address of the destination computer with a port address of a proxy port connected to the destination computer as the inbound host ID if it is determined that the inbound topology is a proxy topology According to this embodiment of the invention, the host address and the port address are separated by an address separator. The address separator can further comprise a secure sockets layer (SSL) separator, a hypertext transfer protocol (HTTP) proxy separator, and a SOCKS proxy separator. The host address comprises, in sequential order, an Internet protocol (IP) address with a corresponding network port number, an address separator, and another IP address with an associated network port number.

The data can also be routed to an external network (such as WAN 120) through the Internet if it is determined that the data are routed outbound. An additional embodiment of the data routing method according to the invention further comprises the steps of, if it is determined that the data are routed outbound, determining if the Internet is directly accessible and directly routing the data to the Internet if it is determined that the Internet is directly accessible.

Yet an additional embodiment of the data routing method according to the invention further comprises the steps of, if it is determined that the data are routed outbound, determining if the outbound topology is a proxy topology and assigning a proxy address with a port address of a proxy port connected to the Internet as the outbound host ID if it is determined that the outbound topology is a proxy topology. The outbound host ID comprises an Internet protocol (IP) address with a network port number.

A further embodiment of the data routing method according to the invention further comprises the step of embedding authentication data in the inbound host ID or the outbound host ID. The data routing method according to the invention can otherwise comprise the step of deploying authentication data on all of the plurality of computers in the network.

Another embodiment of the data routing method according to the invention further comprises the steps of, if it is determined that the data are routed inbound, determining if the inbound topology is a dynamic host configuration protocol (DHCP) assigned Internet protocol (IP) topology, determining if an IP address in the inbound host ID has dynamically changed if it is determined that the inbound topology is a DHCP assigned IP topology, and substituting the IP address in the inbound host ID with the dynamically changed IP address.

Yet another embodiment of the data routing method according to the invention further comprises the steps of, if it is determined that the data are routed outbound, determining if the outbound topology is a dynamic host configuration protocol (DHCP) assigned Internet protocol (IP) topology, determining if an IP address in the outbound host ID has dynamically changed if it is determined that the outbound topology is a DHCP assigned IP topology, and substituting the IP address in the outbound host ID with the dynamically changed IP address.

Figure 5:
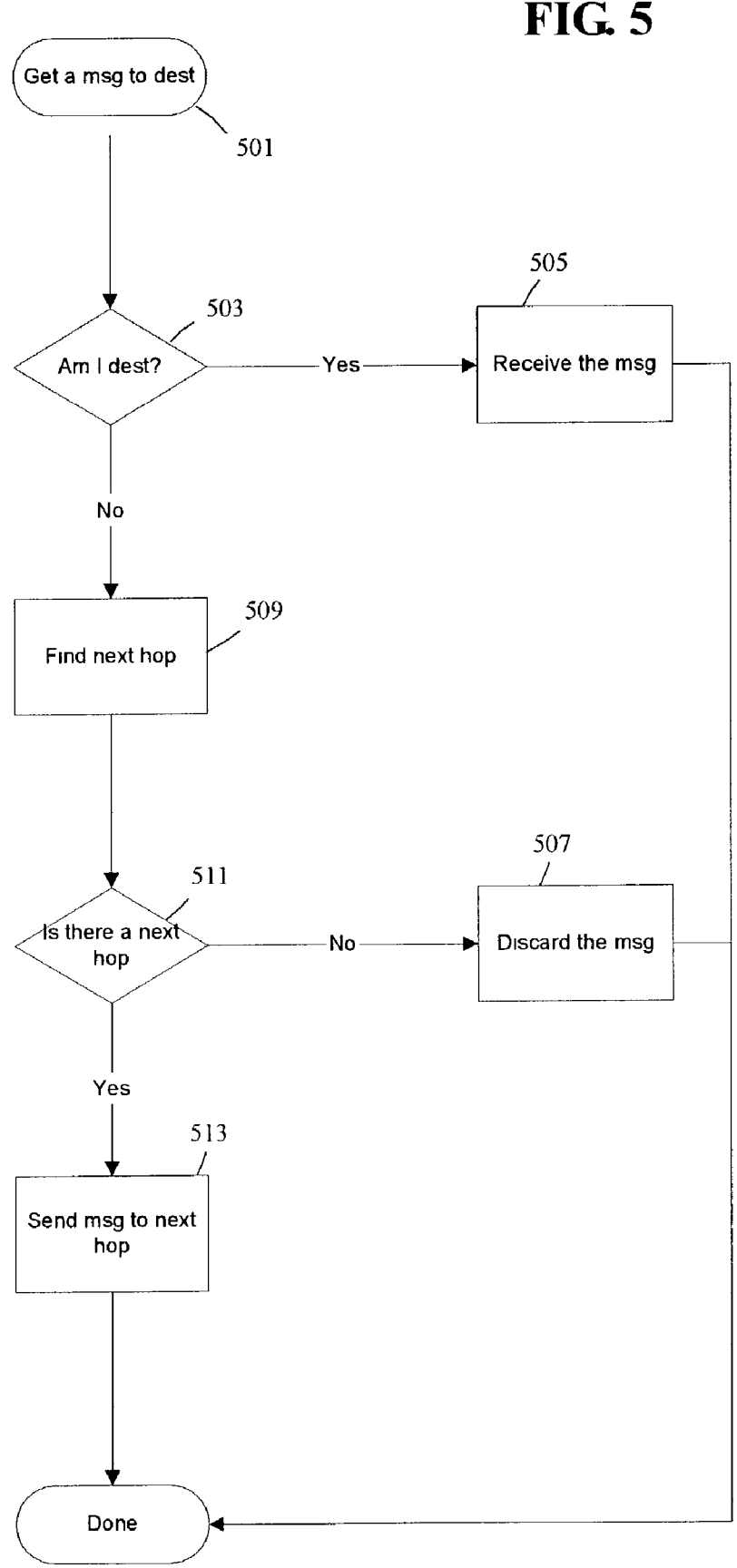
FIGS. 5, 6 and 7 are flow diagrams further illustrating the data routing method for a computer network according to additional embodiments of the invention.
Figure 6:
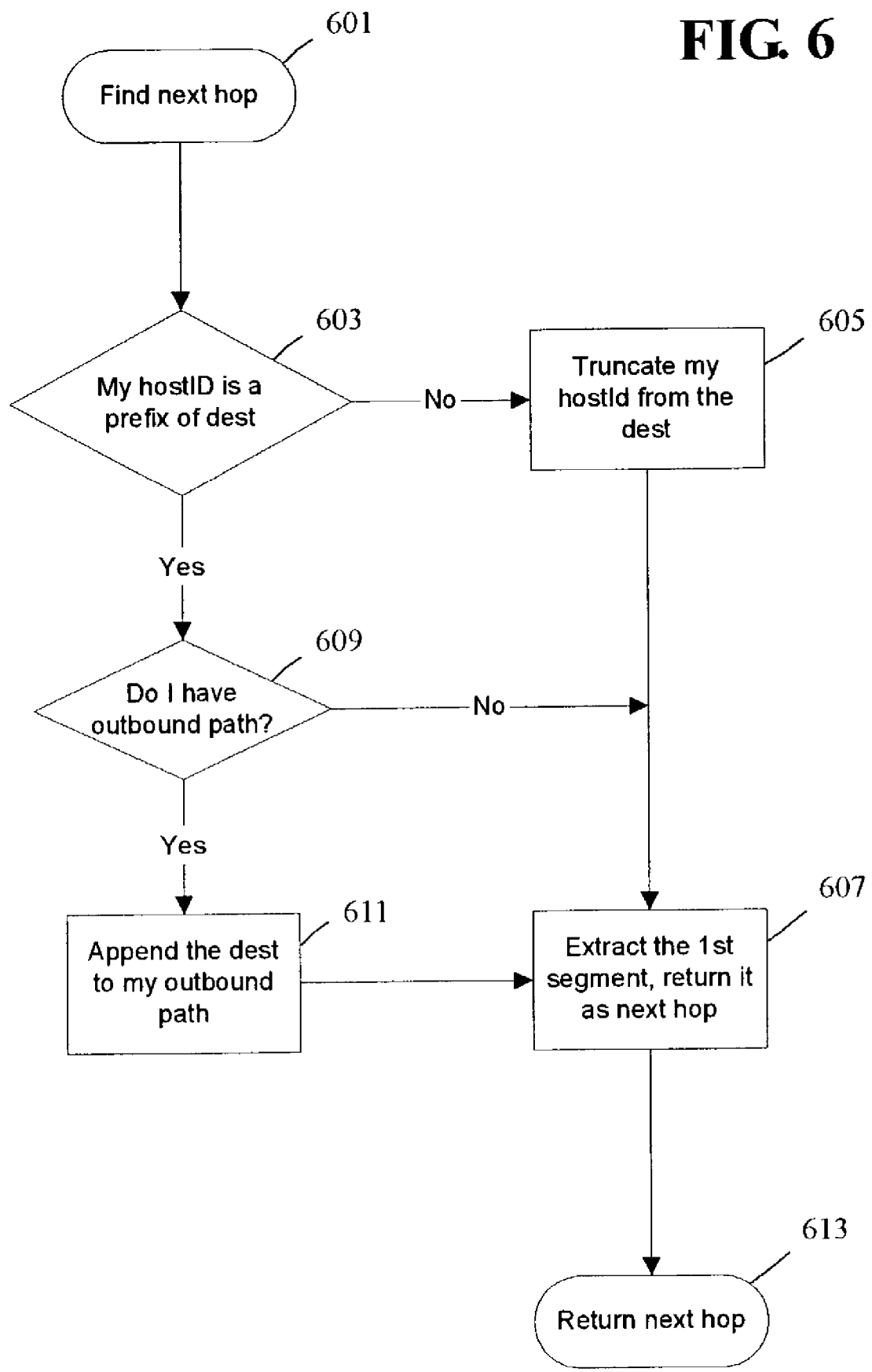
Figure 7:
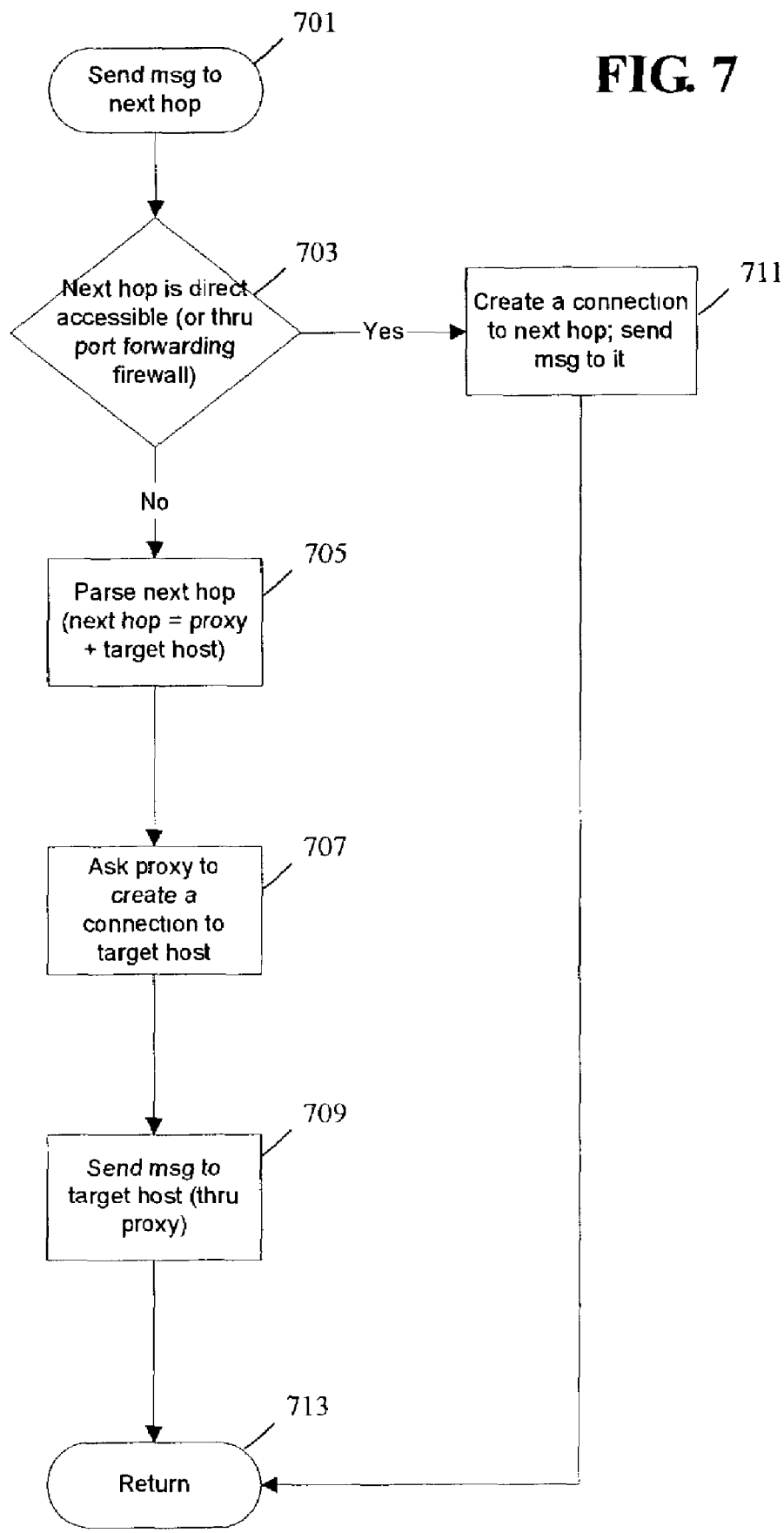

FIGS. 5, 6 and 7 are flow diagrams that further illustrate the data routing method for a computer network according to additional embodiments of the invention. Referring to FIG. 5 where the routing method according to the invention is generally illustrated, a message is sent to a destination in step 501. In step 503, as the message is routed to a particular device node in the network (such as LAN 100), it is determined whether that device node is the destination for the message. If so, the control flow of the method according to the invention is directed to step 505 where the message is accordingly received at the destination. If it is determined that the device node is not the destination in step 503, the control flow of the method according to the invention is directed to step 509. In step 509, the message is sent to the next hop according to the methodologies of the invention as described herein and below. In step 511, it is determined whether another hop is required in reaching the destination. If not, the control flow of the method according to the invention is directed to step 507 where the message is discarded. If it is determined that no more hops are required in reaching the destination in step 511, the control flow of the method according to the invention is directed to step 513 where the message is sent to the next hop.

Referring to FIG. 6 where step 509 of FIG. 5 is illustrated in further detail, step 601 involves finding the next hop for routing the message to the destination. In step 603, it is determined whether the host ID for the device node where the message originated is a prefix of the host ID for the destination. If no, the control flow of the method according to the invention is directed to step 605 where the host ID of the originating device node is truncated from the host ID of the destination. If it is determined in step 603 that the host ID for the device node where the message originated is a prefix of the host ID for the destination, the control flow of the method according to the invention is directed to step 609. In step 609, it is determined whether there is an outbound path to the destination. If no, the control flow of the method according to the invention is directed to step 607 where the first segment of the host ID of the originating device node is extracted and used as the next hop. If it is determined in step 609 that there is an outbound path to the destination, the control flow of the method according to the invention is directed to step 611. In step 611, the host ID of the destination is appended to the outbound path, where the control flow of the method according to the invention is directed to step 607 where the first segment of the host ID of the originating device node is extracted and used as the next hop. In step 613, the next hop is returned, e.g., to step 511 of FIG. 5.

Referring to FIG. 7 where step 513 of FIG. 5 is illustrated in further detail, step 701 involves the step of sending the message to the next hop. In step 703, it is determined whether the next hop is directly accessible (e.g., through a port forwarding firewall). If so, a connection for the next hop is created, to which the message is sent in step 711. If it is determined in step 703 that the next hop is not directly accessible (e.g., through a port forwarding firewall), the control flow of the method according to the invention is directed to step 705. In step 705, the next hop is parsed, i.e., the next hop=proxy+target host (i.e., destination). In step 707, the proxy is requested to create a connection to the target host (i.e., destination). In step 709, the message is sent to the target host (i.e., destination) through the proxy. In step 713, the control flow of the method according to the invention is returned, e.g., to FIG. 5.

An additional preferred embodiment of a network (such as LAN 100) routing data thereto and therefrom according to the invention comprises a plurality of computers corresponding to a plurality of network topologies, means for determining if the data are routed inbound with respect to the network, an elector electing a destination computer from the computers if it is determined that the data are routed inbound, means for determining if the data are routed outbound with respect to the network, means for determining an inbound routing path to the destination computer having an inbound host ID in accordance with an inbound topology out of the plurality of network topologies if it is determined that the data are routed inbound, means for determining an outbound routing path to the Internet having an outbound host ID in accordance with an outbound topology with respect to the Internet out of the plurality of network topologies if it is determined that the data are routed outbound, an inbound router routing the data to the destination computer according to the inbound routing path if it is determined that the data are routed inbound, and an outbound router routing the data to the Internet according to the outbound routing path if it is determined that the data are routed outbound.

The network topologies can further comprise a packet filtering firewall topology, a port forwarding firewall topology, a proxy topology, a private Internet protocol (IP) topology, multiple Internet protocol (IP) topology, and dynamic host configuration protocol (DHCP) assigned Internet protocol (IP) topology. The inbound host ID can include an address separator. In particular, the inbound host ID further comprises an Internet protocol (IP) address, a domain name, a network port number, a secure sockets layer (SSL) separator, a hypertext transfer protocol (HTTP) proxy separator, a SOCKS proxy separator, and a concatenator. The outbound host ID can include an address separator. In particular, the outbound host ID can further comprise an Internet protocol (IP) address, a domain name, a network port number, a secure sockets layer (SSL) separator, a hypertext transfer protocol (HTTP) proxy separator, a SOCKS proxy separator, and a concatenator. The inbound host ID can further comprise a sequence of at least one host address corresponding to at least one of the computers.

A further embodiment of a network (such as LAN 100) routing data thereto and therefrom according to the invention further comprises means for determining if the destination computer is directly accessible, and an address assignor assigning a host address of the destination computer as the inbound host ID if it is determined that the destination computer is directly accessible. The host address can comprise an Internet protocol (IP) address with a network port number. The host address can otherwise comprise a domain name plus a network port number.

Another embodiment of a network (such as LAN 100) routing data thereto and therefrom according to the invention further comprises means for determining if the destination computer comprises two or more Internet protocol (IP) addresses, wherein the host address comprises the IP addresses separated by an address separator if it is determined that the destination computer is directly accessible and the destination computer comprises two or more IP addresses. The host address comprises, in sequential order, an Internet protocol (IP) address with a network port number, an address separator, and a further IP address with a further network port number. The host address comprises a domain name plus a network port number.

Yet another embodiment of a network (such as LAN 100) routing data thereto and therefrom according to the invention further comprises means for determining if the destination computer comprises a private Internet protocol (IP) address and a public IP address, and an address assignor assigning the public IP address as the host address if it is determined that the destination computer is directly accessible.

An additional embodiment of a network (such as LAN 100) routing data thereto and therefrom according to the invention further comprises means for determining if the inbound topology is a packet filtering firewall topology, and an address assignor assigning a host address of the destination computer as the inbound host ID if it is determined that the inbound topology is a packet filtering firewall topology. The host address can comprise an Internet protocol (IP) address with a network port number. The host address can otherwise comprise a domain name plus a network port number.

Yet an additional embodiment of a network (such as LAN 100) routing data thereto and therefrom according to the invention further comprises means for determining if the inbound topology is a port forwarding firewall topology, and an address assignor assigning a port address of a firewall port connected to the destination computer as the inbound host ID if it is determined that the destination topology is a port forwarding firewall topology. The port address can comprise an Internet protocol (IP) address with a network port number. The port address can otherwise comprise a domain name plus a network port number.

Another embodiment of a network (such as LAN 100) routing data thereto and therefrom according to the invention further comprises means for determining if the inbound topology is a proxy topology, and an address assignor assigning a host address of the destination computer with a port address of a proxy port connected to the destination computer as the inbound host ID if it is determined that the inbound topology is a proxy topology. The host address and the port address are separated by an address separator. The address separator can further comprise a secure sockets layer (SSL) separator, a hypertext transfer protocol (HTTP) proxy separator, and a SOCKS proxy separator. The host address comprises, in sequential order, an Internet protocol (IP) address with a network port number, an address separator, and a further IP address with a further network port number.

The data can also be routed to an external network through the Internet if the data are routed outbound. For routing data outbound, yet another embodiment of a network (such as LAN 100) routing data thereto and therefrom according to the invention further comprises means for determining if the Internet is directly accessible, and an outbound router directly routing the data to the Internet if it is determined that the Internet is directly accessible.

For routing data outbound, an additional embodiment of a network (such as LAN 100) routing data thereto and therefrom according to the invention further comprises means for determining if the outbound topology is a proxy topology, and an address assignor assigning a proxy address with a port address of a proxy port connected to the Internet as the outbound host ID if it is determined that the outbound topology is a proxy topology. The outbound host ID can comprise an Internet protocol (IP) address with a network port number.

For routing data inbound or outbound, according to yet an additional embodiment of a network (such as LAN 100) routing data thereto and therefrom according to the invention, authentication data can be embedded in the inbound host ID or the outbound host ID. The authentication data can otherwise be deployed on all of the plurality of computers in the network.

For routing data inbound, another embodiment of a network (such as LAN 100) routing data thereto and therefrom according to the invention further comprises means for determining if the inbound topology is a dynamic host configuration protocol (DHCP) assigned Internet protocol (IP) topology, means for determining if an IP address in the inbound host ID has dynamically changed if it is determined that the inbound topology is a DHCP assigned IP topology, and an address assignor substituting the IP address in the inbound host ID with the dynamically changed IP address.

For routing data outbound, yet another embodiment of a network (such as LAN 100) routing data thereto and therefrom according to the invention further comprises means for determining if the outbound topology is a dynamic host configuration protocol (DHCP) assigned Internet protocol (IP) topology, means for determining if an IP address in the outbound host ID has dynamically changed if it is determined that the outbound topology is a DHCP assigned IP topology, and an address assignor substituting the IP address in the outbound host ID with the dynamically changed IP address.

Figure 8:
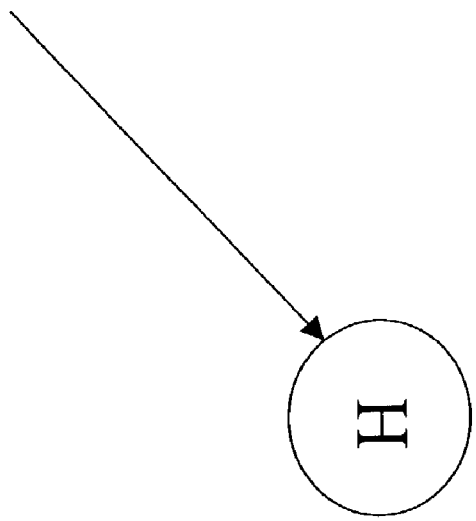
FIGS. 8, 9, 10 and 11 are block diagrams illustrating exemplary addressing methodologies and associated host ID addressing for accessing a destination host computer or workstation in a network according to various embodiments of the method according to the invention.
Figure 9:
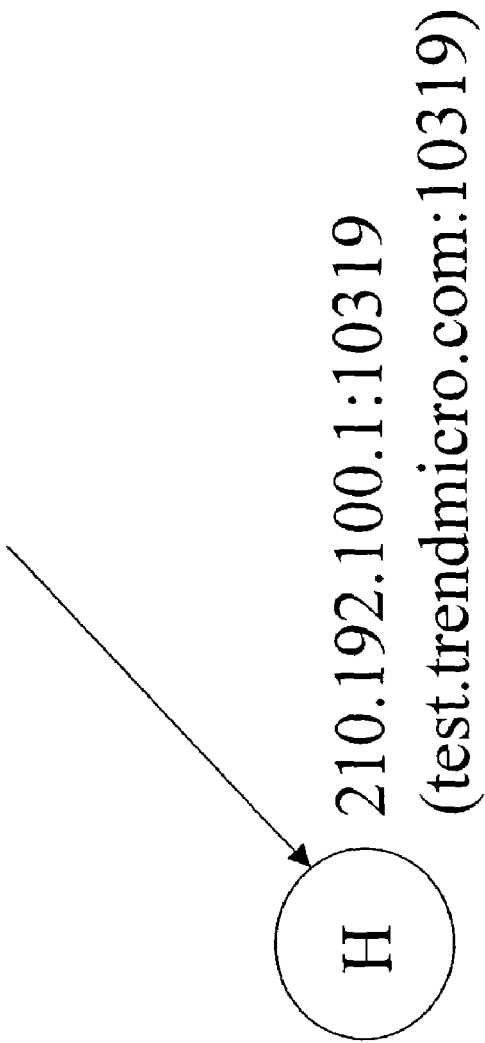

FIGS. 8, 9, 10 and 11 are block diagrams that illustrate exemplary addressing methodologies and associated host ID addressing for accessing a destination host computer or workstation in a network according to various embodiments of the method according to the invention. Referring to FIG. 8 in particular where a destination host computer or workstation H is directly accessible for inbound data routing, the routing path determined for the inbound data comprises a host address of the destination host H as its host ID in the routing path. Referring to FIG. 9, the routing path for inbound data routing to a destination host computer or workstation H comprises a host address having an IP address 210.192.100.1 with a network port number 10319. The host address can also be an exemplary domain name "test.trendmicro.com" for the destination host H with a network port number 10319. The host ID accordingly comprises an IP address 210.192.100.1 with a network port number 10319, or a domain name "test.trendmicro.com" with a network port number 10319.

Figure 10:
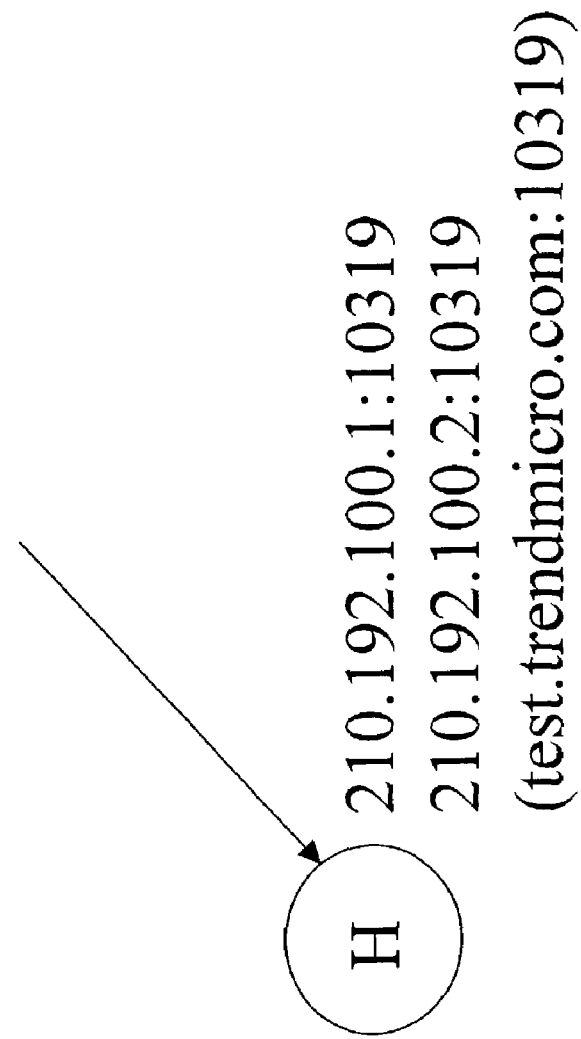

Referring to FIG. 10 where a destination host computer or workstation H comprises two or more IP addresses, the host address of the host ID for inbound data routing to destination host H comprises the two or more IP addresses separated by an address separator. For instance, the destination host H comprises two IP addresses 210.192.100.1 and 210.192.100.2, with a network port number 10319 and domain name "test.trendmicro.com" therefor. The host address of the host ID for destination host H accordingly comprises, in sequential order, an IP address with a corresponding network port number, an address separator, and another IP address with an associated network port number. That is, the host address of the host ID for destination host H comprises, e.g., the IP address 210.192.100.1 with network port number 10319 and IP address 210.192.100.2 with network port number 10319 separated by the address separator "|" for inbound data access thereto. The host address of the host ID for destination host H can also comprise the domain name "test.trendmicro.com" with the network port number 10319.

Figure 11:
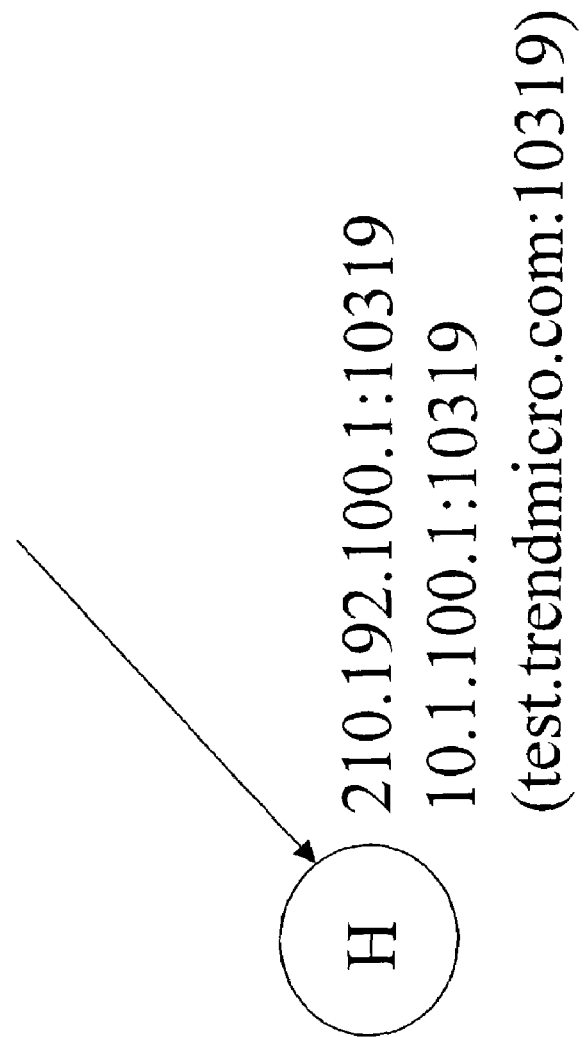

Referring to FIG. 11 where a destination host computer or workstation H comprises a private IP address and a public IP address, the public IP address is assigned as the host address of the host ID for inbound data access to the destination H. For instance, the destination H, having an exemplary domain name "test.trendmicro.com" therefor, comprises a public IP address 210.192.100.1 with a network port number 10319, and a private IP address 10.1.100.1 with network port number 10319. The host address accordingly comprises the public IP address only with the corresponding network port number. That is, the host address of the host ID for destination host H comprises the public IP address 210.192.100.1 with the corresponding network port number 10319. The host address for destination host H can also comprise the domain name "test.trendmicro.com" with the network port number 10319. Note that an exception exists in a situation in which the destination host H and the start position for sending the data are located within the same private network, where the private IP address is assigned as the host address.

Figure 12:
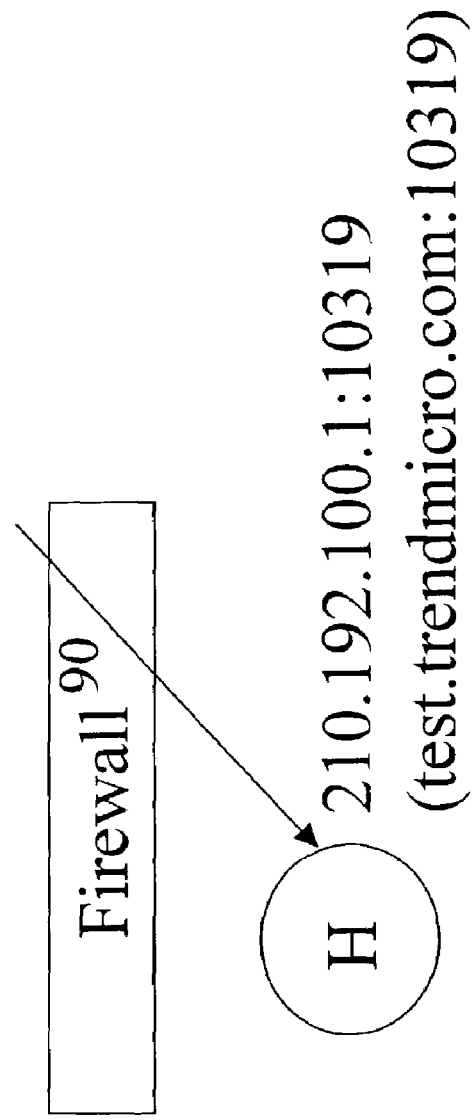
FIG. 12 is a block diagram generally illustrating exemplary addressing methodologies and associated host ID addressing for accessing a destination host computer or workstation in a network having a packet filtering firewall topology in accordance with another embodiment of the invention.

FIG. 12 is a block diagram that generally illustrates exemplary addressing methodologies and associated host ID addressing for accessing a destination host computer or workstation H in a network having a packet filtering firewall topology in accordance with another embodiment of the invention. In accordance with packet filtering firewall topology, a destination host computer or workstation H is disposed behind a firewall 90 in a network (such as LAN 100) for inbound data access thereto. For example, the host address for destination H, having an exemplary domain name "test.trendmicro.com" therefor, is 210.192.100.1 with a corresponding network port number 10319. The host address for destination host H accordingly serves as the host ID for inbound data access to destination host H. That is, the host ID for inbound data access to destination H comprises the host address 210.192.100.1 with the network port number 10319. The host ID for inbound data access for destination H can also comprise the domain name "test.trendmicro.com" with the network port number 10319.

Figure 13:
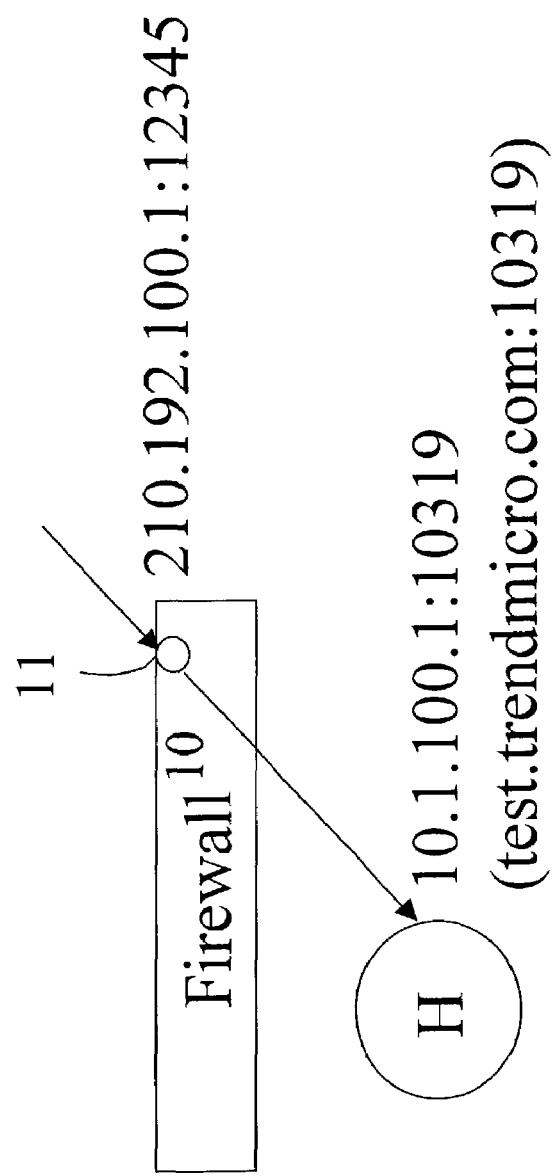
FIG. 13 is a block diagram generally illustrating exemplary addressing methodologies and associated host ID addressing for accessing a destination host computer or workstation in a network having a port forwarding firewall topology in accordance with yet another embodiment of the invention.

FIG. 13 is a block diagram that generally illustrates exemplary addressing methodologies and associated host ID addressing for accessing a destination host computer or workstation H in a network having a port forwarding firewall topology in accordance with yet another embodiment of the invention. In accordance with port forwarding firewall topology, a destination host computer or workstation H is disposed behind a firewall 10 with a network port 11 (serving as an access interface therefor) in a network (such as LAN 100) for inbound data access to the destination host H. For example, the host address for destination H, having an exemplary domain name "test.trendmicro.com" therefor, is 10.1.100.1 with a corresponding network port number 10319, whereas the port address for the network port 11 is 210.192.100.1 with a corresponding network port number 12345. The port address of network port 11 for destination host H accordingly serves as the host ID for inbound data access to destination host H. That is, the host ID for inbound data access to destination H comprises the port address 210.192.100.1 with the network port number 12345.

Figure 14:
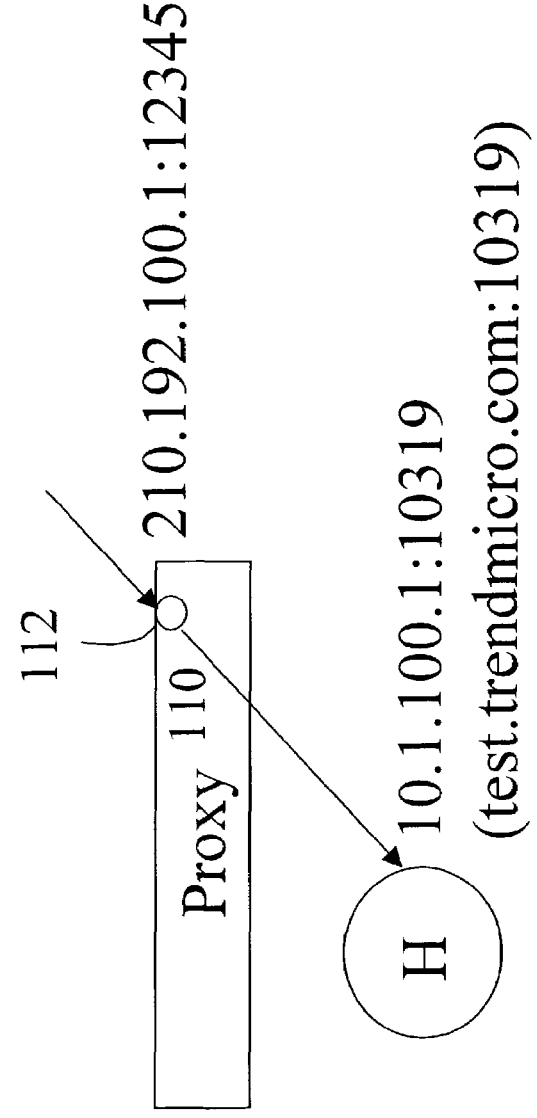
FIGS. 14 and 15 are block diagrams illustrating exemplary addressing methodologies and associated host ID addressing for accessing a destination host computer or workstation in a network having a proxy topology in accordance with an additional embodiment of the invention.

FIG. 14 is a block diagram that generally illustrates exemplary addressing methodologies and associated host ID addressing for accessing a destination host computer or workstation H in a network (such as LAN 100) having a proxy topology in accordance with an additional embodiment of the invention. In accordance with proxy topology, the destination host H is disposed behind a proxy 110 with a network port 112 serving as the inbound data access interface therefor. For instance, the destination host H comprises a host address 10.1.100.1 with a corresponding network port number 10319 and domain name "test.trendmicro.com" therefor. The proxy 110, e.g., comprises a proxy address 210.192.100.1, whereas the network port 112 comprises an associated network port number 12345. According to the method of the invention, the host ID for inbound data access to the destination host H accordingly comprises the host address of destination host H with the port address of the proxy port connected thereto, separated by an address separator. That is, the host ID for destination host H accordingly comprises, in sequential order, the proxy port address with a corresponding network port number, an address separator, and the host address with an associated network port number. The address separator can comprise, e.g., a secured sockets layer (SSL) separator, a hypertext transfer protocol (HTTP) proxy separator, or a SOCKS proxy separator. For instance, the host ID for destination host H comprises, e.g., the proxy port address 210.192.100.1 with network port number 12345 and host address 10.1.100.1 with network port number 10319 separated by the address separator "~" for inbound data access thereto. The host ID for destination host H can also comprise the proxy port address 210.192.100.1 with network port number 12345 and the domain name "test.trendmicro.com" with network port number 10319 separated by the address separator "~" for inbound data access thereto.

Figure 15:
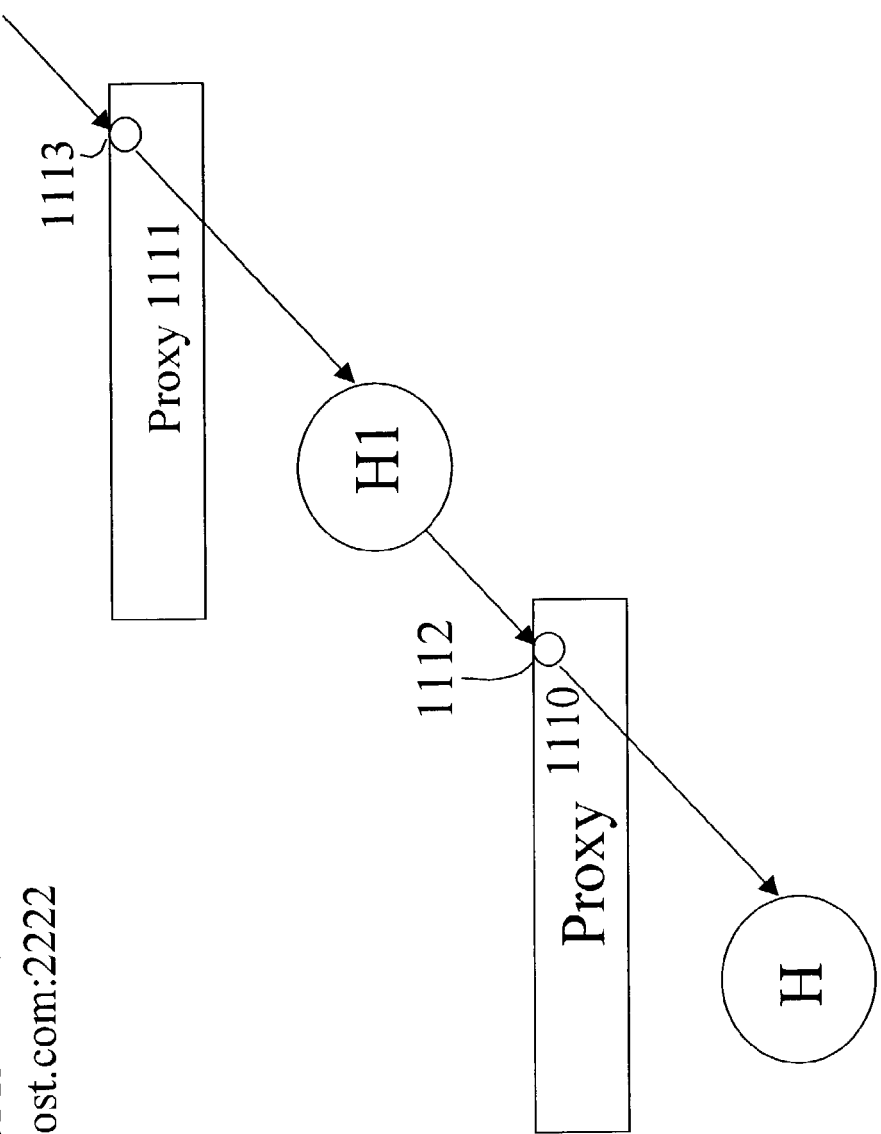

FIG. 15 is another block diagram that further illustrates exemplary addressing methodologies and associated host ID addressing for accessing a destination host computer or workstation H in a network (such as LAN 100) having a proxy topology in accordance with yet an additional embodiment of the invention. The destination host H is disposed behind a proxy 1110 with a network port 1112 serving as the inbound data access interface therefor. A further host computer or workstation H1 is disposed behind another proxy 1111 with a corresponding network port 1113 and before the proxy 1110, serving as the inbound data access interface for the host H. For instance, the host computer H1 comprises a host address 10.1.100.1 with a corresponding network port number 10319 and domain name "host1.com" therefor. The proxy 1111, e.g., comprises a proxy address 210.192.100.1, whereas the network port 1113 comprises an associated network port number 12345. According to the method of the invention, the host ID for inbound data access to the host computer H1 accordingly comprises the host address of host H1 with the port address of the proxy port connected thereto, separated by an address separator. That is, the host ID for destination host H1 accordingly comprises, in sequential order, the proxy port address with a corresponding network port number, an address separator, and the host address with an associated network port number. The address separator can comprise, e.g., a secured sockets layer (SSL) separator, a hypertext transfer protocol (HTTP) proxy separator, or a SOCKS proxy separator. For instance, the host ID for the host computer H1 comprises, e.g., the proxy port address 210.192.100.1 with network port number 12345 and host address 10.1.100.1 with network port number 10319 separated by the address separator "~" for inbound data access thereto. The host ID for the host computer H1 can also comprise the proxy port address 210.192.100.1 with network port number 12345 and the domain name "host1.com" with network port number 10319 separated by the address separator "~" for inbound data access thereto.

In addition, the host computer H comprises a host address with a corresponding network port number 2222 and domain name "host.com" therefor. The proxy 1110, e.g., also comprises a proxy address with a corresponding domain name proxy1110.com, whereas the network port 1112 comprises an associated network port number 1111. Further according to the method of the invention, the host ID for inbound data access to the host computer H accordingly comprises the host address of host H with the port address of the proxy port connected thereto, separated by an address separator, with a concatenator and the host ID of the host computer H1. That is, the host ID for destination host H accordingly comprises, in sequential order, the proxy port address with a network port number proximate to host computer H1, an address separator, the host address for host H1 with an associated network port number, a concatenator (i.e., the symbol ">"), the proxy port address (e.g., "proxy1110.com") with a network port number (e.g., "1111") proximate to the host computer H, another address separator, and the host address for host H (e.g., "host.com") with an associated network port number (e.g., "2222"). The host ID for host computer H1 comprises, e.g., the proxy port address 210.192.100.1 with network port number 12345 and host address 10.1.100.1 with network port number 10319 separated by the address separator "~" for inbound data access thereto. The host ID for the host computer H1 can also comprise the proxy port address 210.192.100.1 with network port number 12345 and the domain name "host1.com" with network port number 10319 separated by the address separator "~" for inbound data access thereto. Accordingly, the host ID for the destination host computer H is 210.192.100.1:12345~10.1.100.1:10319>proxy1110.com:1111~host.com:2222.

Figure 16:
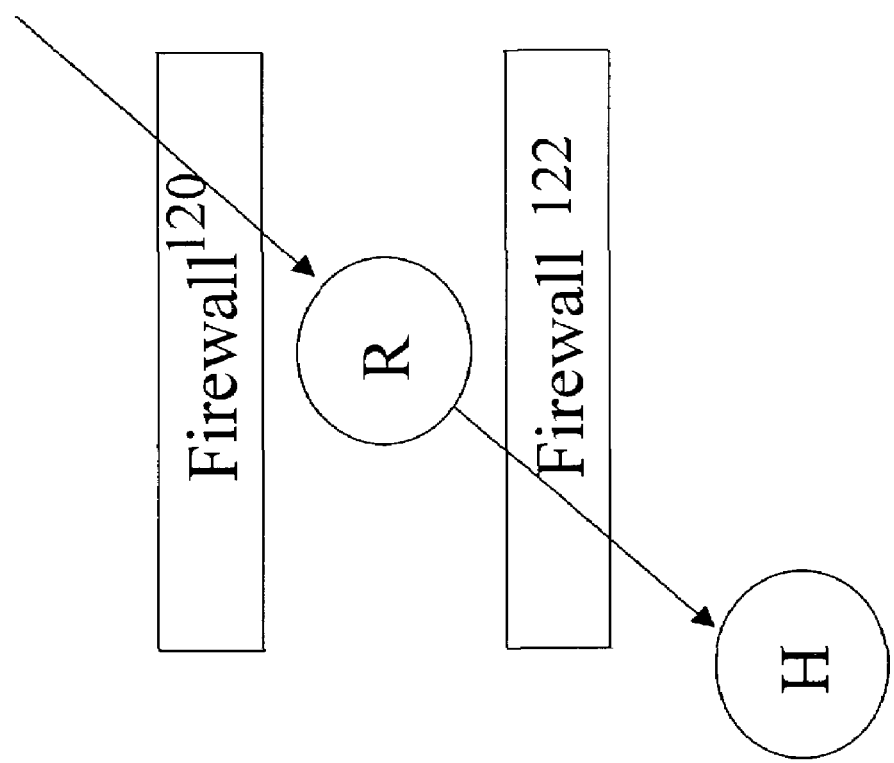
FIG. 16 is a block diagram generally illustrating an exemplary relay host topology in accordance with the invention.

FIG. 16 is a block diagram that generally illustrates an exemplary relay host topology in accordance with the invention for accessing a destination host computer or workstation H in a network (such as LAN 100) having a relay host R disposed between firewalls 120 and 122. The method according to the invention can similarly be applicable to such a relay host topology in accordance with the detailed description provided herein and above.

Figure 17:
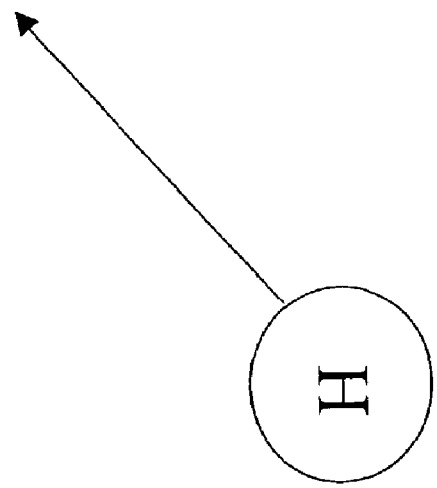
FIG. 17 is a block diagram generally illustrating exemplary addressing methodologies and associated host ID addressing for outbound access to the Internet from a host computer or workstation in a network in accordance with yet an additional embodiment of the invention.

FIG. 17 is a block diagram that generally illustrates exemplary addressing methodologies and associated host ID addressing for outbound access to the Internet from a host computer or workstation H in a network (such as LAN 100) in accordance with yet an additional embodiment of the invention. It is first determined if the Internet is directly accessible from the host H. If it is determined that the Internet is directly accessible, host H then directly accesses the Internet.

Figure 18:
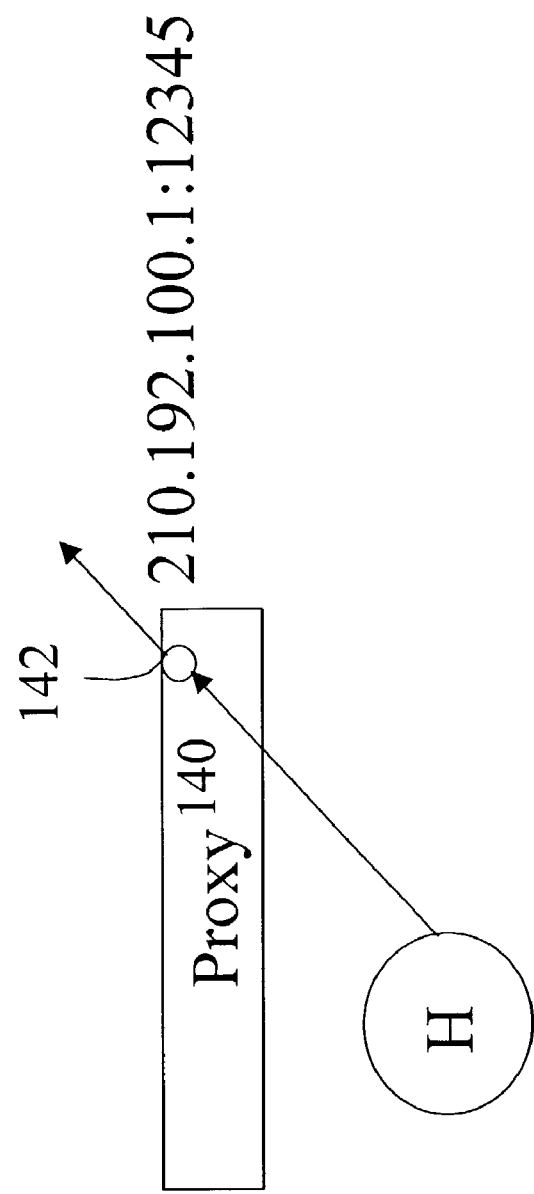
FIG. 18 is a block diagram generally illustrating exemplary addressing methodologies and associated host ID addressing for outbound access to the Internet from a host computer or workstation in a network having a proxy topology in accordance with a further embodiment of the invention.

FIG. 18 is a block diagram that generally illustrates exemplary addressing methodologies and associated host ID addressing for outbound access to the Internet from a host computer or workstation H in a network (such as LAN 100) having a proxy topology in accordance with a further embodiment of the invention. In accordance with proxy topology, the host H is disposed behind a proxy 140 with a network port 142 serving as the outbound data access interface therefor. For instance, the destination host H comprises a host address 10.1.100.1 with a corresponding network port number 10319 and domain name "test.trendmicro.com" therefor. The proxy 140, e.g., comprises a proxy address 210.192.100.1, whereas the network port 112 comprises an associated network port number 12345. According to the method of the invention, the host ID for outbound data access to the Internet from the host H accordingly comprises the proxy port address of the proxy port connected to the host H. If there are further computers or workstations on the outbound routing path, their IP addresses can be appended to the proxy port address, with an address separator disposed successively therebetween. That is, the host ID for outbound data access from the host H accordingly comprises, in sequential order, the proxy port address with a corresponding network port number, and an address separator (if necessary) and the IP address of the succeeding computer or workstation in the outbound path (if any). The address separator can comprise, e.g., a secured sockets layer (SSL) separator, a hypertext transfer protocol (HTTP) proxy separator, or a SOCKS proxy separator. For instance, the host ID for outbound access to the Internet from the host H comprises, e.g., the proxy port address 210.192.100.1 with network port number 12345. The host ID for outbound access to the Internet can also comprise the proxy port address 210.192.100.1 with network port number 12345, an address separator "~" appended thereto (if necessary), and the IP address of the succeeding computer or workstation in the outbound path (if any).

Figure 19:
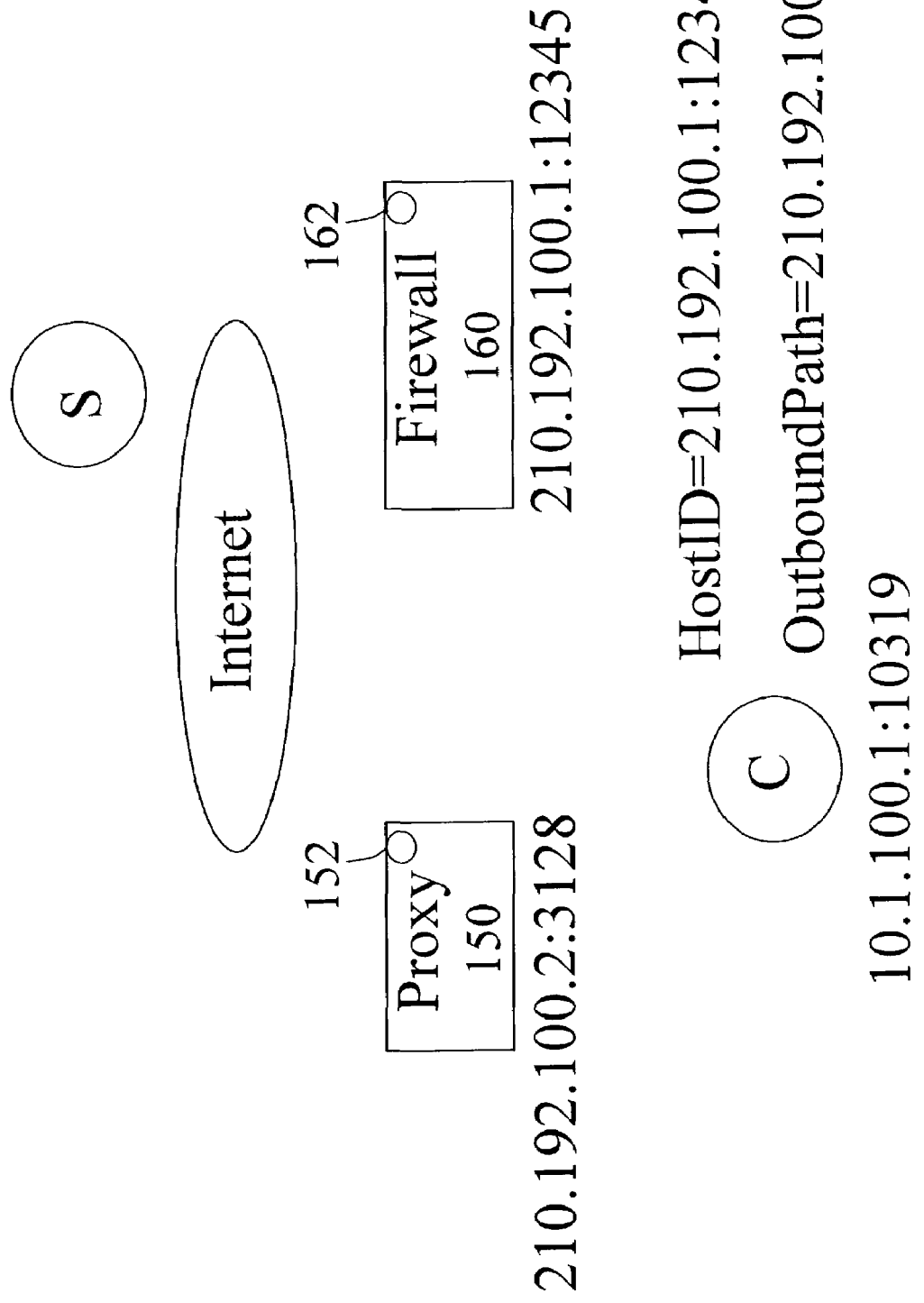
FIG. 19 is a block diagram generally illustrating exemplary addressing methodologies and associated host ID addressing for outbound access to the Internet from a client host computer or workstation in a network having a mixed network topology in accordance with a particular embodiment of the invention.

FIG. 19 is a block diagram that generally illustrates exemplary addressing methodologies and associated host ID addressing for outbound access to the Internet from a client host computer or workstation C in a network (such as LAN 100) having a mixed network topology in accordance with a particular embodiment of the invention. The network comprises a client host C, a proxy 150 having a proxy port 152, and a firewall 160 having a network port 162. The network is connected to the Internet, and can access a wide area network (WAN) or an external server S (e.g., an application service provider, commercial service provider, network service provider, or antivirus service provider) through the Internet. In this particular embodiment according to the invention, the IP address for the client host C is 10.1.100.1 with a corresponding network port number 10319. The IP address for the firewall 160 is 210.192.100.1 with an associated network port number 12345 for the network port 162. The IP address for the proxy 150 is 210.192.100.2 with a proxy port number 3128 for the proxy port 152. For outbound data access from the client host C to the Internet (or external server S), the Host ID for the outbound routing path is the port address of the firewall connected to the client host C in accordance with the invention, as the client host C is disposed behind a port forwarding firewall 160 in a port forwarding network topology, namely 210.192.100.1:12345. The outbound routing path for outbound access to the Internet from the client host C is accordingly 210.192.100.2:3128~.

It would be apparent to one skilled in the art that the invention can be embodied in various ways and implemented in many variations. Such variations are not to be regarded as a departure from the spirit and scope of the invention. In particular, the process steps of the method according to the invention will include methods having substantially the same process steps as the method of the invention to achieve substantially the same results. Substitutions and modifications have been suggested in the foregoing Detailed Description, and others will occur to one of ordinary skill in the art. All such modifications as would be obvious to one skilled in the art are intended to be included within the scope of the following claims and their equivalents.

We claim:

1. A method for routing data into and out of a computer network having a plurality of host computers, each host computer associated with a respective network within said computer network, the method comprising:
    electing a destination host from said host computers;
    determining an addressing methodology for said destination host in accordance with a network configuration of a destination network associated with said destination host;
    assigning a host ID to said destination host according to said determined addressing methodology, said host ID comprising a sequence of destination internet protocol (IP) addresses corresponding to the destination network configuration, said sequence of destination IP addresses defining a routing path within the destination network; and
    routing said data to said destination host through said routing path in accordance with said host ID.

2. The method of claim 1 wherein said network configurations include at least one of:
    a packet filtering firewall server;
    a port forwarding firewall server;
    a proxy server;
    a private Internet protocol (IP);
    a multiple Internet protocol (IP);
    a dynamic host configuration protocol:
    a relay host;
    multiple host servers; or a directly accessible destination host.

3. The method of claim 1 wherein said host ID further comprises:
    a domain name;
    a network port number;
    a hypertext transfer protocol (HTTP) proxy separator;
    a SOCKS proxy separator; and
    a concatenator.

4. The method of claim 1 wherein said routing path comprises an inbound routing path and an outbound routing path with respect to said network.

5. The method of claim 1 further comprising the steps of:
    determining if said destination host is directly accessible; and
    assigning a host address of said destination host as said host ID if it is determined that said destination host is directly accessible.

6. The method of claim 5 wherein said host address comprises an Internet protocol (IP) address with a network port number.

7. The method of claim 5 wherein said host address comprises a domain name plus a network port number.

8. The method of claim 5 further comprising the step of:
    determining if said destination host comprises two or more Internet protocol (IP) addresses; and
    wherein said host address comprises said IP addresses separated by an address separator if it is determined that said destination host is directly accessible and said destination host comprises two or more Internet protocol (IP) addresses.

9. The method of claim 8 wherein said host address comprises a domain name plus a network port number.

10. The method of claim 5 wherein said host address comprises, in sequential order, an Internet protocol (IP) address with a network port number, an address separator, and a further IP address with a further network port number.

11. The method of claim 5 further comprising the steps of:
    determining if said destination host comprises a private Internet protocol (IP) address and a public IP address; and
    assigning said public IP address as said host address if it is determined that said destination host is directly accessible.

12. The method of claim 5 further comprising the steps of:
    determining if said destination host comprises a private Internet protocol (IP) address in a private network and a public IP address; and
    assigning said private IP address as said host address wherein said destination host is located within said private network.

13. The method of claim 5 wherein said host address comprises, in sequential order, an Internet protocol (IP) address with a network port number, an address separator, and a further IP address with a further network port number.

14. The method of claim 1, further comprising the steps of:
    determining if said destination configuration includes a packet filtering firewall server; and
    assigning a host address of said destination host as said host ID if it is determined that said destination configuration includes a packet filtering firewall server.

15. The method of claim 14 wherein said host address comprises an Internet protocol (IP) address with a network port number.

16. The method of claim 14 wherein said host address comprises a domain name plus a network port number.

17. The method of claim 1, further comprising the steps of:
    determining if said destination configuration includes a port forwarding firewall server; and assigning a port address of a firewall port connected to said destination host as said host ID if it is determined that said destination configuration includes a port forwarding firewall server.

18. The method of claim 17 wherein said port address comprises an Internet protocol (IP) address with a network port number.

19. The method of claim 17 wherein said port address comprises a domain name plus a network port number.

20. The method of claim 1, further comprising the steps of:
determining if said destination configuration includes a proxy server; and
assigning a host address of said destination host with a port address of a proxy port connected to said destination host as said host ID if it is determined that said destination configuration includes a proxy server.

21. The method of claim 20 wherein said host address and said port address are separated by an address separator.

22. The method of claim 21 wherein said address separator further comprises a hypertext transfer protocol (HTTP) proxy separator and a SOCKS proxy separator.

23. The method of claim 20 wherein said host address comprises, in sequential order, an Internet protocol (IP) address with a network port number, an address separator, and a further IP address with a further network port number.

24. The method of claim 1, wherein said elected destination host is the Internet.

25. The method of claim 24 further comprising the steps of:
determining if the Internet is directly accessible; and
directly routing said data to the Internet if it is determined that the Internet is directly accessible.

26. The method of claim 24 further comprising the steps of:
determining if said destination configuration includes a proxy server; and
assigning a proxy address with a port address of a proxy port connected to the Internet as said host ID if it is determined that said destination configuration includes a proxy server.

27. The method of claim 26 wherein said host ID comprises an Internet protocol (IP) address with a network port number.

28. The method of claim 1, further comprising the step of embedding authentication data in said host ID.

29. The method of claim 1 further comprising the steps of:
defining said routing path in a host ID comprising an Internet protocol (IP) address;
determining if said destination configuration includes a dynamic host configuration protocol (DHCP);
determining if said IP address has dynamically changed if it is determined that said destination configuration includes a DHCP; and
substituting said IP address in said host ID with said dynamically changed IP address.

30. The method of claim 1, wherein said host ID further comprises an address separator.

31. A method for routing data into and out of a network having a plurality of computers, each host computer associated with a respective network within said computer network, the method comprising:
determining if said data are routed inbound or outbound with respect to said network;
electing a destination computer from said computers if it is determined that said data are routed inbound;
assigning an inbound host ID to said destination computer in accordance with an inbound network configuration, if it is determined that said data are routed inbound, said inbound host ID comprising a sequence of destination internet protocol (IP) addresses conesponding to said inbound network configuration, said sequence of destination IP addresses defining an inbound routing path within the inbound network;
determining an outbound routing path to the Internet having an outbound host ID in accordance with an outbound configuration with respect to the Internet out of said network configurations, if it is determined that said data are routed outbound, said outbound configuration conesponding to said outbound routing path to the Internet;
routing said data to said destination computer according to said inbound routing path if it is determined that said data are routed inbound; and
routing said data to the Internet according to said outbound routing path if it is determined that said data are routed outbound.

32. The method of claim 1 wherein said network configurations include at least one of:
a packet filtering firewall server;
a port forwarding firewall server;
a proxy server;
a private Internet protocol (IP);
a multiple Internet protocol (IP);
a dynamic host configuration protocol:
a relay host;
multiple host servers; or a directly accessible destination host.

33. The method of claim 31 wherein said inbound host ID further comprises:
a domain name;
a network port number;
a hypertext transfer protocol (HTTP) proxy separator;
a SOCKS proxy separator; and
a concatenator.

34. The method of claim 31 wherein said outbound host ID comprises:
an Internet protocol (IP) address;
a domain name;
a network port number;
a hypertext transfer protocol (HTTP) proxy separator;
a SOCKS proxy separator; and
a concatenator.

35. The method of claim 31 further comprising the steps of:
determining if said destination computer is directly accessible; and
assigning a host address of said destination computer as said inbound host ID if it is determined that said destination computer is directly accessible.

36. The method of claim 35 wherein said host address comprises an Internet protocol (IP) address with a network port number.

37. The method of claim 35 wherein said host address comprises a domain name plus a network port number.

38. The method of claim 35 further comprising the step of:
determining if said destination computer comprises two or more Internet protocol (IP) addresses; and
wherein said host address comprises said IP addresses separated by an address separator if it is determined that said destination computer is directly accessible and said destination computer comprises two or more IP addresses.

39. The method of claim 38 wherein said host address comprises a domain name plus a network port number.

40. The method of claim 35 further comprising the steps of:
   determining if said destination computer comprises a private Internet protocol (IP) address and a public IP address; and
   assigning said public IP address as said host address if it is determined that said destination computer is directly accessible.

41. The method of claim 35 further comprising the steps of:
   determining if said destination computer comprises a private Internet protocol (IP) address in a private network and a public IP address; and
   assigning said private IP address as said host address wherein said destination computer is located within said private network.

42. The method of claim 31 further comprising the steps of:
   determining if said inbound configuration includes a packet filtering firewall server; and
   assigning a host address of said destination computer as said inbound host ID if it is determined that said inbound configuration includes a packet filtering firewall server.

43. The method of claim 42 wherein said host address comprises an Internet protocol (IP) address with a network port number.

44. The method of claim 42 wherein said host address comprises a domain name plus a network port number.

45. The method of claim 31 further comprising the steps of:
   determining if said inbound configuration includes a port forwarding firewall server; and
   assigning a port address of a firewall port connected to said destination computer as said inbound host ID if it is determined that said inbound configuration includes a port forwarding firewall server.

46. The method of claim 45 wherein said port address comprises an Internet protocol (IP) address with a network port number.

47. The method of claim 45 wherein said port address comprises a domain name plus a network port number.

48. The method of claim 31 further comprising the steps of:
   determining if said inbound configuration includes a proxy server; and
   assigning a host address of said destination computer with a port address of a proxy port connected to said destination computer as said inbound host ID if it is determined that said inbound configuration includes a proxy server.

49. The method of claim 48 wherein said host address and said port address are separated by an address separator.

50. The method of claim 49 wherein said address separator further comprises a hypertext transfer protocol (HTTP) proxy separator and a SOCKS proxy separator.

51. The method of claim 48 wherein said host address comprises, in sequential order, an Internet protocol (IP) address with a network port number, an address separator, and a further IP address with a further network port number.

52. The method of claim 31 wherein said data are routed to an external network through the Internet if it is determined that said data are routed outbound.

53. The method of claim 31 further comprising the steps of:
   if it is determined that said data are routed outbound, determining if the Internet is directly accessible; and
   directly routing said data to the Internet if it is determined that the Internet is directly accessible.

54. The method of claim 31 further comprising the steps of:
   if it is determined that said data are routed outbound, determining if said outbound configuration includes a proxy server; and
   assigning a proxy address with a port address of a proxy port connected to the Internet as said outbound host ID if it is determined that said outbound configuration includes a proxy server.

55. The method of claim 54 wherein said outbound host ID comprises an Internet protocol (IP) address with a network port number.

56. The method of claim 31 further comprising the step of embedding authentication data in said inbound host ID and said outbound host ID.

57. The method of claim 31 further comprising the steps of:
   if it is determined that said data are routed inbound, determining if said inbound configuration includes a dynamic host configuration protocol (DHCP);
   determining if an IP address in said inbound host ID has dynamically changed if it is determined that said inbound configuration includes a DHCP; and
   substituting said IP address in said inbound host ID with said dynamically changed IP address.

58. The method of claim 31 wherein each of said inbound host ID and said outbound host ID further comprises an address separator.

59. A computer network for routing data thereto and therefrom, the computer network comprising:
   a plurality of host computers, each host computer associated with a respective network within said computer network;
   means for determining if said data are routed inbound or outbound with respect to said computer network;
   an elector electing a destination host computer from said host computers if it is determined that said data are routed inbound;
   means for assigning an inbound host ID to said destination computer in accordance with an inbound network configuration, if it is determined that said data are routed inbound, said inbound host ID comprising a sequence of destination internet protocol (IP) addresses corresponding to said inbound network configuration, said sequence of destination IP addresses defining an inbound routing path within the inbound network;
   means for determining an outbound routing path to the Internet having an outbound host ID in accordance with an outbound configuration with respect to the Internet out of said network configurations, if it is determined that said data are routed outbound, said outbound configuration corresponding to said outbound routing path to the Internet;
   means for an inbound routing said data to said destination computer according to said inbound routing path if it is determined that said data are routed inbound; and
   means for routing said data to said Internet according to said outbound routing path if it is determined that said data are routed outbound.

60. The method of claim 1 wherein said network configurations include at least one of:
a packet filtering firewall server;
a port forwarding firewall server;
a proxy server;
a private Internet protocol (IP);
a multiple Internet protocol (IP);
a dynamic host configuration protocol:
a relay host;
multiple host servers; or
a directly accessible destination host.

61. The network of claim 59 wherein said inbound host ID further comprises:
a domain name;
a network port number;
a hypertext transfer protocol (HTTP) proxy separator;
a SOCKS proxy separator; and
a concatenator.

62. The network of claim 61 wherein said host address comprises an Internet protocol (IP) address with a network port number.

63. The network of claim 59 wherein said outbound host ID comprises:
an Internet protocol (IP) address;
a domain name;
a network port number;
a hypertext transfer protocol (HTTP) proxy separator;
a SOCKS proxy separator; and
a concatenator.

64. The network of claim 59 further comprising:
means for determining if said destination computer is directly accessible; and
an address assignor assigning a host address of said destination computer as said inbound host ID if it is determined that said destination computer is directly accessible.

65. The network of claim 64 wherein said host address comprises an Internet protocol (IP) address with a network port number.

66. The network of claim 64 wherein said host address comprises a domain name plus a network port number.

67. The network of claim 64 further comprising:
means for determining if said destination computer comprises two or more Internet protocol (IP) addresses; and
wherein said host address comprises said IP addresses separated by an address separator if it is determined that said destination computer is directly accessible and said destination computer comprises two or more IP addresses.

68. The network of claim 67 wherein said host address comprises a domain name plus a network port number.

69. The network of claim 64 wherein said host address comprises, in sequential order, an Internet protocol (IP) address with a network port number, an address separator, and a further IP address with a further network port number.

70. The network of claim 64 further comprising:
means for determining if said destination computer comprises a private Internet protocol (IP) address and a public IP address; and
an address assignor assigning said public IP address as said host address if it is determined that said destination computer is directly accessible.

71. The network of claim 64 further comprising:
means for determining if said destination computer comprises a private Internet protocol (IP) address in a private network and a public IP address; and
an address assignor assigning said private IP address as said host address wherein said destination computer is located within said private network.

72. The network of claim 59 further comprising:
means for determining if said inbound configuration includes a packet filtering firewall server; and
an address assignor assigning a host address of said destination computer as said inbound host ID if it is determined that said inbound configuration includes a packet filtering firewall server.

73. The network of claim 72 wherein said host address comprises a domain name plus a network port number.

74. The network of claim 59 further comprising:
means for determining if said inbound configuration includes a port forwarding firewall server; and
an address assignor assigning a port address of a firewall port connected to said destination computer as said inbound host ID if it is determined that said inbound configuration includes a port forwarding firewall server.

75. The network of claim 74 wherein said port address comprises an Internet protocol (IP) address with a network port number.

76. The network of claim 74 wherein said port address comprises a domain name plus a network port number.

77. The network of claim 59 further comprising:
means for determining if said inbound configuration includes a proxy server; and
an address assignor assigning a host address of said destination computer with a port address of a proxy port connected to said destination computer as said inbound host ID if it is determined that said inbound configuration includes a proxy server.

78. The network of claim 77 wherein said host address and said port address are separated by an address separator.

79. The network of claim 78 wherein said address separator further comprises a hypertext transfer protocol (HTTP) proxy separator and a SOCKS proxy separator.

80. The network of claim 77 wherein said host address comprises, in sequential order, an Internet protocol (IP) address with a network port number, an address separator, and a further IP address with a further network port number.

81. The network of claim 59 wherein said data are routed to an external network through said Internet if it is determined that said data are routed outbound.

82. The network of claim 59 further comprising:
if it is determined that said data are routed outbound,
means for determining if said Internet is directly accessible; and
an outbound router directly routing said data to said Internet if it is determined that said Internet is directly accessible.

83. The network of claim 59 further comprising:
if it is determined that said data are routed outbound,
means for determining if said outbound configuration includes a proxy server; and
an address assignor assigning a proxy address with a port address of a proxy port connected to said Internet as said outbound host ID if it is determined that said outbound configuration includes a proxy server.

84. The network of claim 83 wherein said outbound host ID comprises an Internet protocol (IP) address with a network port number.

85. The network of claim 59 wherein authentication data are embedded in said inbound host ID and said outbound host ID.

86. The network of claim 59 further comprising:
if it is determined that said data are routed inbound,
means for determining if said inbound configuration includes a dynamic host configuration protocol (DHCP);
means for determining if an IP address in said inbound host ID has dynamically changed if it is determined that said inbound configuration includes a DHCP; and
an address assignor substituting said IP address in said inbound host ID with said dynamically changed IP address.

87. The network of claim 59 wherein each of said inbound host ID and said outbound host ID further comprises an address separator.

\* \* \* \* \*

UNITED STATES PATENT AND TRADEMARK OFFICE
CERTIFICATE OF CORRECTION

PATENT NO. : 7,373,423 B2  
APPLICATION NO. : 10/243490  
DATED : May 13, 2008  
INVENTOR(S) : Song et al.

It is certified that error appears in the above-identified patent and that said Letters Patent is hereby corrected as shown below:

Col. 20, line 5, (Claim 31), change "conesponding" to --corresponding--.

Col. 20, line 14, (Claim 31), change "conesponding" to --corresponding--.

Col. 22, line 60, (Claim 59), change "conesponding" to --corresponding--.

Col. 22, line 62, (Claim 59), delete "an inbound" after "means for".

Col. 23, lines 43 and 44 (Claim 67), change "compnses" to --comprises--.

Signed and Sealed this

Twentieth Day of January, 2009

JON W. DUDAS  
*Director of the United States Patent and Trademark Office*